(12) United States Patent
Appleby

(10) Patent No.: US 7,447,623 B2
(45) Date of Patent: Nov. 4, 2008

(54) MACHINE TRANSLATION

(75) Inventor: Stephen C Appleby, Colchester (GB)

(73) Assignee: British Telecommunications public limited company, London (GB)

(*) Notice: Subject to any disclaimer, the term of this patent is extended or adjusted under 35 U.S.C. 154(b) by 995 days.

(21) Appl. No.: 10/493,948

(22) PCT Filed: Oct. 29, 2002

(86) PCT No.: PCT/GB02/04893

§ 371 (c)(1),
(2), (4) Date: Apr. 28, 2004

(87) PCT Pub. No.: WO03/038663

PCT Pub. Date: May 8, 2003

(65) Prior Publication Data

US 2004/0254781 A1    Dec. 16, 2004

(30) Foreign Application Priority Data

Oct. 29, 2001  (EP)  ................................. 01309152
Oct. 29, 2001  (EP)  ................................. 01309153

(51) Int. Cl.
*G10L 15/00*  (2006.01)

(52) U.S. Cl. .................................. 704/2; 704/8; 704/9

(58) Field of Classification Search ..................... 704/2, 704/8, 9
See application file for complete search history.

(56) References Cited

U.S. PATENT DOCUMENTS

| | | | |
|---|---|---|---|
| 6,233,544 B1* | 5/2001 | Alshawi | 704/2 |
| 6,393,389 B1* | 5/2002 | Chanod et al. | 704/7 |
| 2002/0040292 A1* | 4/2002 | Marcu | 704/4 |
| 2004/0039563 A1* | 2/2004 | Suzuki | 704/2 |
| 2005/0049851 A1* | 3/2005 | Watanabe et al. | 704/2 |

* cited by examiner

*Primary Examiner*—Daniel D Abebe
(74) *Attorney, Agent, or Firm*—Nixon & Vanderhye, PC

(57) ABSTRACT

A computer language translation development system, for developing data for use in translation, comprising: means for utilising corresponding source and target example texts to generate translation units each comprising, in the source and/or target language, a first language item and a second language item of the same language, and means for subsequently generating restrictions on candidate second language items which can be combined with each said first language item. A computer language translation development system, for developing data for use in translation, comprising: means for generating original translation units each comprising, in the source and/or target language, a first language item, and property data which restricts with which second language items that first language item can occur; and means for generating additional synthetic translation units comprising new combinations of the first language items and property data of said original translation units.

20 Claims, 21 Drawing Sheets

MACHINE TRANSLATION

This application is the US national phase of international application PCT/GB02/04893 filed in English on 29 Oct. 2002, which designated the US. PCT/GB02/04893 claims priority to GB Application No. 01309152.5 filed 29 Oct. 2001 and GB Application No. 01309153.3 filed 29 Oct. 2001. The entire contents of these applications are incorporated herein by reference.

FIELD OF TECHNOLOGY

This invention relates to machine translation. More particularly, this invention relates to example-based machine translation. Machine translation is a branch of language processing.

BACKGROUND

In most machine translation systems, a linguist assists in the writing of a series of rules which relate to the grammar of the source language (the language to be translated from) and the target language (the language to be translated to) and transfer rules for transferring data corresponding to the source text into data corresponding to the target text. In the classical "transfer" architecture, the source grammar rules are first applied to remove the syntactic dependence of the source language and arrive at something closer to the semantics (the meaning) of the text, which is then transferred to the target language, at which point the grammar rules of the target language are applied to generate syntactically correct target language text.

However, hand-crafting rules for such systems is expensive, time consuming and error prone. One approach to reducing these problems is to take examples of source language texts and their translations into target languages, and to attempt to extract suitable rules from them. In one approach, the source and target language example texts are manually marked up to indicate correspondences.

Prior work in this field is described in, for example, Brown P F, Cocke J, della Pietra S A, della Pietra V J, Jelinek F, Lafferty J D, Mercer R L and Roossin P S 1990, 'A Statistical Approach to Machine Translation', *Computational Linguistics*, 16 2 pp. 79-85; Berger A, Brown P, della Pietra S A, della Pietra V J, Gillett J, Lafferty J, Mercer R, Printz H and Ures L 1994, 'Candide System for Machine Translation', in *Human Language Technology: Proceedings of the ARPA Workshop on Speech and Natural Language*; Sato S and Nagao M 1990, 'Towards Memory-based Translation.', in *COLING '90*; Sato S 1995, 'MBT2: A Method for Combining Fragments of Examples in Example-based Translation', *Artificial Intelligence*, 75 1 pp. 31-49; Güvenir H A and Cicekli I 1998, 'Learning Translation Templates from Examples', *Information Systems*, 23 6 pp. 353-636; Watanabe H 1995, 'A Model of a Bi-Directional Transfer Mechanism Using Rule Combinations', *Machine Translation*, 10 4 pp. 269-291; Al-Adhaileh M H and Kong T E, 'A Flexible Example-based Parser based on the SSTC', in Proceedings of COLING-ACL '98, pp. 687-693.

Sato and Nagao developed a system which represents the source and target texts as planar dependency trees. A dependency tree is a particular type of dependency graph. In a dependency graph, the words of the text correspond to nodes which are linked so that a word which depends on another (i.e. modifies the meaning of or is in some relationship with another) is linked by a (directional) dependency relationship. A dependency graph is a tree if each node (other than one unique "root" node) depends on precisely one other (although one node may have several depending from it; in other words may dominate several others). A planar tree is a tree in which, when the words are arranged in their original sequence, the "projection constraint" is satisfied; in other words, every word within the span of each node is dominated by that node; in other words, graphically, no dependency line crosses another. Planar trees are particularly computationally efficient, and it is therefore advantageous to use them.

However, planar trees are only readily useful when the words which depend on each other in the source and target texts are contiguous; in other words, contiguous sequences of words in the source text are translation by contiguous sequences of words in the target text. At sentence level, this is likely to be true, but it would be desirable to reduce the maximum size of translation units (i.e. parts of the sentences such as phrases) which could be translated, since shorter phrases are more generally applicable, and hence allow more translation coverage from a smaller number of examples. Different approaches to this problem have been taken in the prior art. Because of this problem, it has not been possible simply to align source and target language phrases by shoring connection data connecting the head words of the phrases.

Sato's MBT2 method analyses both the source and target texts as simple planar trees, and uses simple tree alignment to express the relationship between the trees in the source and target languages. The trees found in the examples are generalised by allowing some specific transforms, such as adding and deleting nodes; and the translations produced by Sato's system are ranked using a measure of similarity with existing translations.

SUMMARY

The present invention employs a multi level representation of the source and target texts. The first level depends upon the surface form (i.e. word order) of the text, and the second level upon the semantic dependencies between the words. Transfer from the source language to the target language is performed using the second level. Target language text is then generated using the first level representation.

In one aspect, the present invention provides a computer language translation development system, for developing data for use in a translation system, comprising: means for utilising corresponding source and target example texts to generate translation units each comprising, in the source and/or target language, a first language item and a second language item of the same language, and means for subsequently generating restrictions on candidate second language items which can be combined with each said first language item.

The restrictions automatically generated can be used to restrict the behaviour of translation components (e.g. short phrases which could take several different further words or phrases as their subject or object) so as to force translation components which appear to behave similarly (e.g. exhibit similar restrictions) to behave identically (e.g. exhibit identical restrictions). This suppresses the generation of multiple possible erroneous translations, improving accuracy and reducing translation time, whilst allowing the use of short translation components (which make the translation system more generally applicable).

A translation system using data thus developed is also provided.

In another aspect, the present invention provides a method for inferring generalisations of translation units from a set of translation unit examples comprising;

the identification of analogous pairs of translation units, each comprising at least one language item and the creation of new translation units which reduce the number of distinct language item behaviours.

In yet another aspect, the present invention provides a computer language translation development system, for developing data for use in translation, comprising:

means for generating original translation units each comprising, in the source and/or target language, a first language item, and property data which restricts with which second language items that first language item can occur; and means for generating additional synthetic translation units comprising new combinations of the first language items and property data of said original translation units.

The invention can therefore generalise from a limited subset of examples, by finding analogous translation units (based on short phrases) from the example texts, and creating new synthetic translation units from these, so as to generalise from the examples given to texts not present in the examples.

In yet another aspect, the invention provides a translation system arranged to perform analysis using data thus generated. In either case, the invention may be implemented as a computer program and encompasses such a program, and a data structure for use thereby.

The invention is generally applicable to the translation approach and methods of machine translation. Embodiments of the invention are able to generalise from a relatively small number of examples of text, and this allows such embodiments to be used with the text held in, for example, a translation memory as described by Melby A K and Wright S E 1999, 'Leveraging Terminological Data For Use In Conjunction With Lexicographical Resources', in *Proceedings of the 5th International Congress on Terminology and Kowledge Representation*, pp. 544-569.

Other embodiments and preferred features are as described and/or claimed herein.

BRIEF DESCRIPTION OF THE DRAWINGS

Embodiments of the present invention will now be described, by way of example only, with reference to the accompanying drawings in which.

DETAILED DESCRIPTION

First Embodiment

Figure 1:
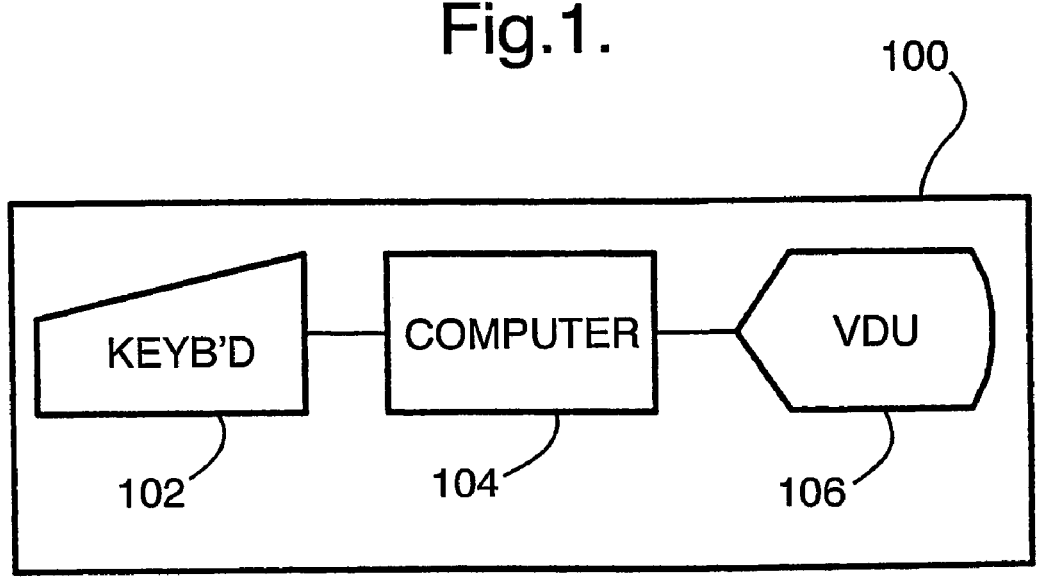
FIG. 1 is block diagram showing the components of a computer translation system according to a first embodiment.

FIG. 1 shows apparatus suitable for implementing the present invention. It consists of a work station 100 comprising a keyboard 102, computer 104 and visual display unit 106. For example, the work station 100 may be a high performance personal computer or a sun work station.

Figure 2:
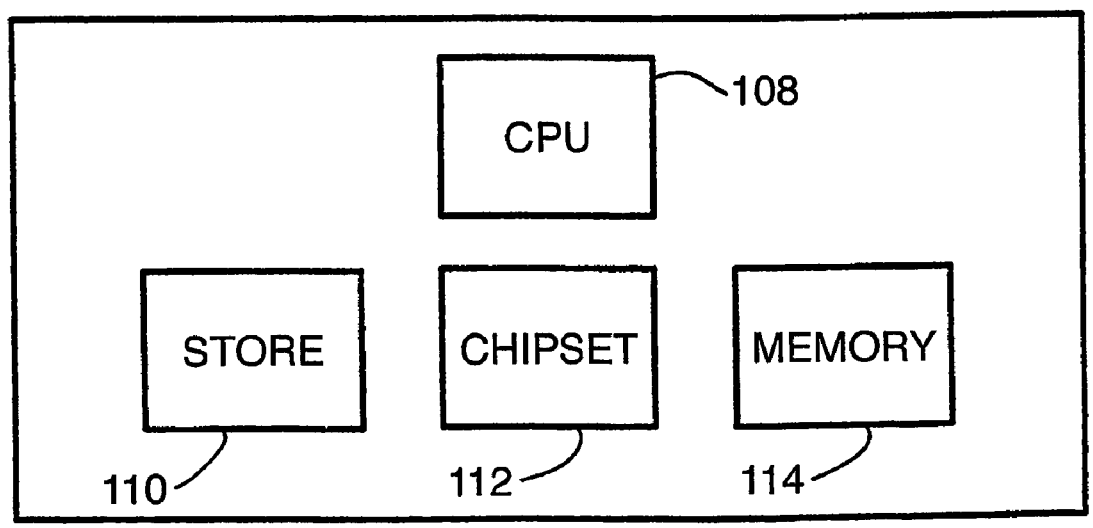
FIG. 2 is a block diagram showing the components of a computer forming part of FIG. 1.

FIG. 2 shows the components of a computer 104 of FIG. 1, comprising a CPU 108 (which may be a Pentium III or reduced instruction set (RISC) processor 108). Connected to the CPU is a peripheral chip set 112 for communicating with the keyboard, VDU and other components; a memory 114 for storing executing programs and working data; and a store 110 storing programs and data for subsequent execution. The store 110 comprises a hard disk drive; if the hard disk drive is not removable then the store 110 also comprises a removable storage device such as a floppy disk drive to allow the input of stored text files.

Figure 3:
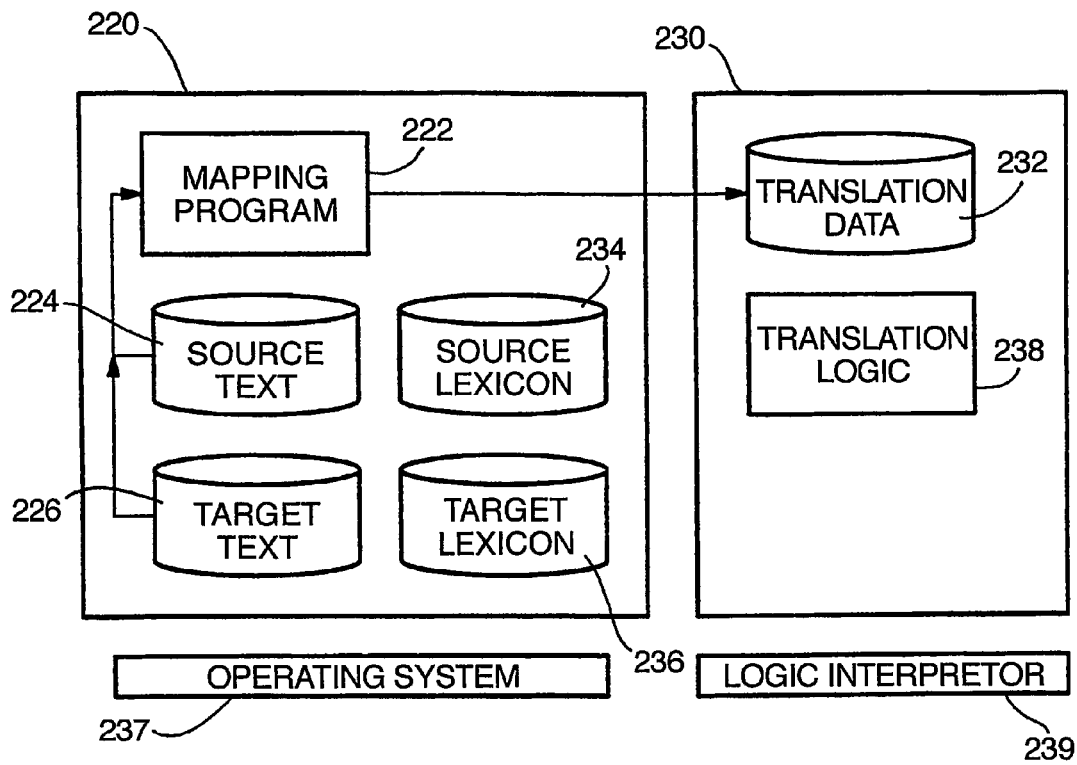
FIG. 3 is a diagram showing the programs and data present within the computer of FIG. 2.

FIG. 3 illustrates the programs and data held on the store 110 for execution by the CPU 108. They comprise a development program 220 and a translation program 230.

The development program comprises a mapping program 222 operating on a source text file 224 and a target text file 226. In this embodiment, it also comprises a source lexicon 234 storing words of the source language together with data on their syntactic and semantic properties, and a target language lexicon 236 storing similar information from the target language, together with mapping data (such as the shared identifiers of the Eurowordnet Lexicon system) which link source and target words which are translations of each other.

The translation program comprises a translation data store 232 stores translation data in the form of PROLOG rules, which are defined by the relationships established by the mapping program 222. A translation logic program 238 (for example a PROLOG program) defines the steps to be taken by the translation program using the rules 232, and a logic interpreter program 239 interprets the translation logic and rules into code for execution by the CPU 108.

Finally, an operating system 237 provides a graphic user interface, input/output functions and the well known functions. The operating system may, for example, be Microsoft Windows™ or Unix or Linux operating in conjunction with X-Windows.

Figure 4:
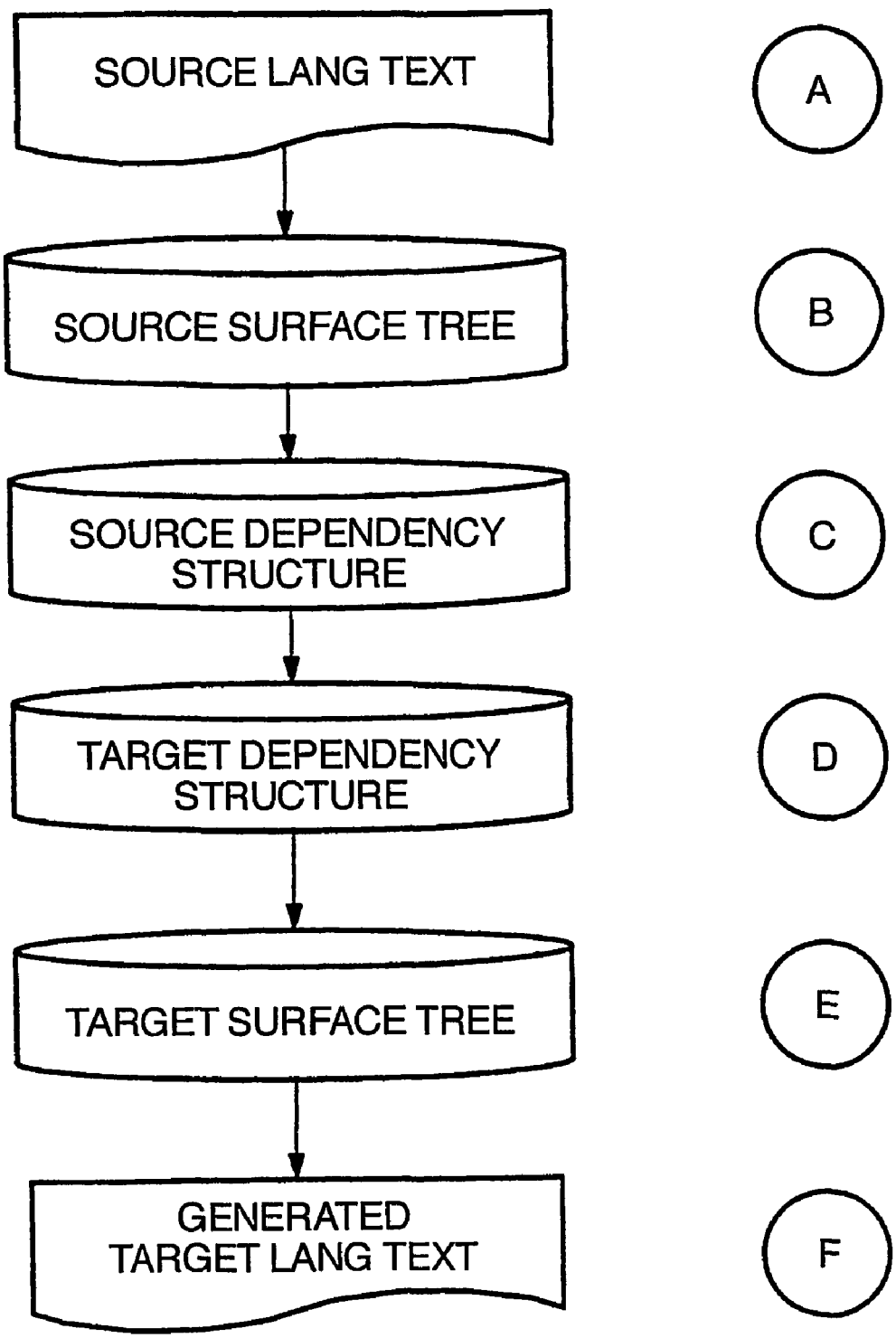
FIG. 4 is an illustrative diagram showing the stages in translation of text according to the present invention.

FIG. 4 is an overview of the translation process. Source language text (A) is parsed to provide data representing a source surface tree (B) corresponding to data defining a source dependency structure (C), which is associated with a target dependency structure (D). The target dependency structure is then employed to generate a target surface tree (E) structure, from which target language text (F) is generated.

These steps will be discussed in greater detail below. First, however, the process performed by the development program 220 in providing the data for use in subsequent translations will be discussed.

Translation Development Program

Figure 5:
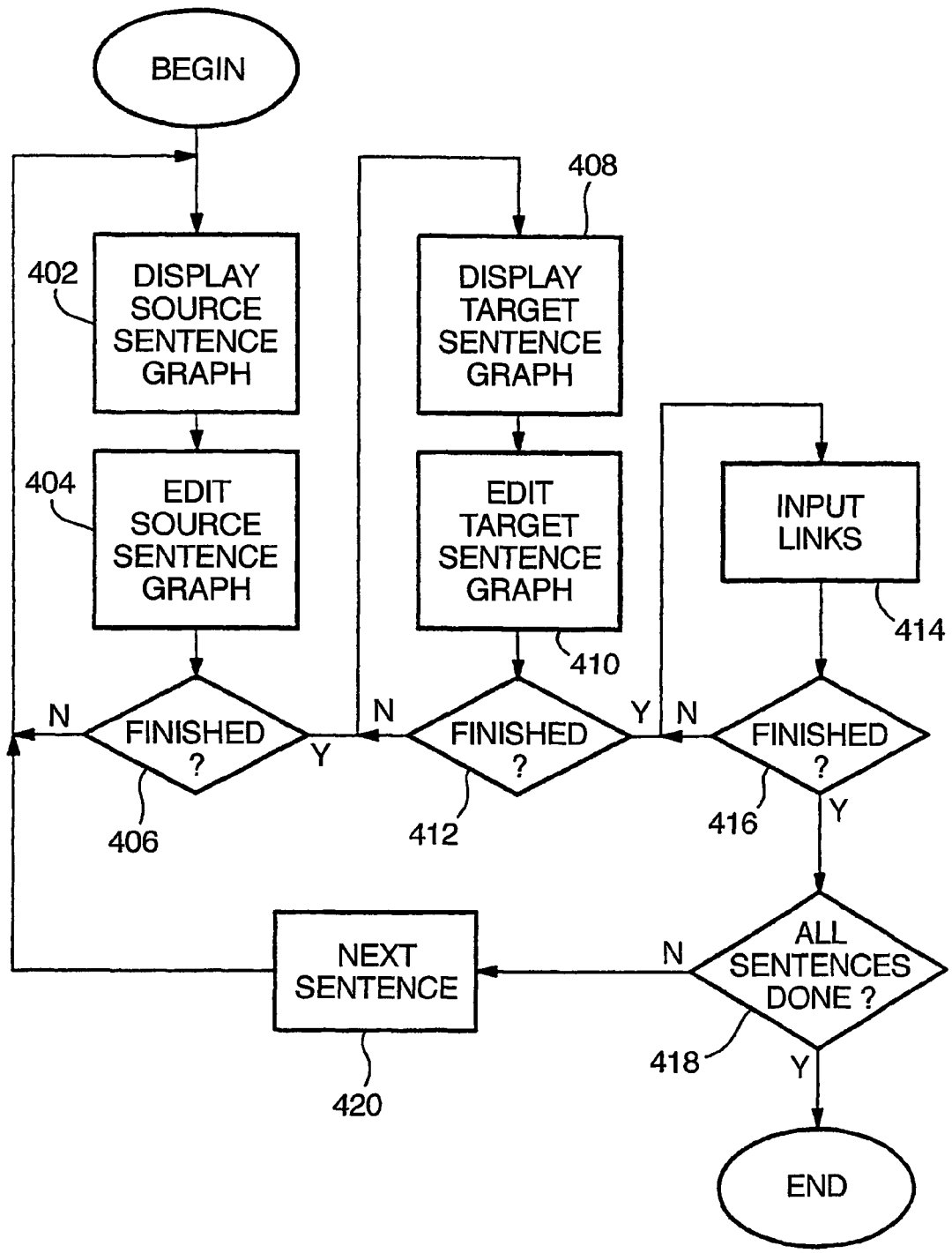
FIG. 5 is a flow diagram showing an annotation process performed by the apparatus of FIG. 1 to assist a human user in marking up example texts.

Referring to FIG. 5, in a step 402, the mapping program 222 creates a screen display (shown in FIG. 6) comprising the words of a first sentence of the source document and the corresponding sentence of the translation document (in this case, the source document has the sentence "I like to swim" in English, and the target document has the corresponding German sentence "Ich schwimme gern"). Each word is displayed within a graphic box 1002-1008, 1010-1014. The mapping program allows the user to move the words vertically, but not to change their relative horizontal positions (which correspond to the actual orders of occurrence of the words in the source and target texts).

The user (a translator or linguist) can then draw (using the mouse or other cursor control device) dependency relationship lines ("links") between the boxes containing the words. In this case, the user has selected "swim" (1008) as the "head" word in the English text and "I" (1002), "like" (1004) "to" (1006) as the "daughters" by drawing dependency lines from the head 1008 to each of the daughters 1002-1006.

At this point, it is noted that all of the daughters 1002-1006 in the source language in this case lie to the left of the head 1008; they are termed "left daughters". One of the heads is marked as the surface root of the entire sentence (or, in more general terms, block of text).

The editing of the source graph (step 404) continues until the user has linked all words required (step 406). The process is then repeated (steps 408, 410, 412) for the target language text (1012-1014).

Once the dependency graphs have been constructed for the source and target language texts, in step 414 the program 222 allows the user to provide connections (links) indicating alignments between words in the source and target language texts which can be paired as translations of each other. In this case, "I" (1002) is paired with "Ich" (1010) and "swim" (1008) with "schwimme" (1012).

Not every word in the source text is directly translatable by a word in the target text, and generally the user will connect only words which are a good direct translation of each other. However, the user will connect words which are at the heads of a pair of phrases which are direct translations, even if those head words themselves are not. For the purpose of the present invention, such connected head words constitute language units deemed directly translatable.

However, it is generally the case in this embodiment that the connection (alignment) indicates not only that phrases below the word (if any) are a translation pair but that the head words themselves also form a translation pair.

When the user has finished (step 416), it is determined whether further sentences within the source and target language files remain to be processed and, if not, the involvement of the user ends and the user interface is closed. If further sentences remain, then the next sentence is selected (step 420) and the process resumes at step 402. At this stage, the data representing the translation examples now consists of a set of nodes representing language units, a set of directed links between the nodes which links define the dependency graphs, and a set of links indicating alignment between the nodes in the two languages. This structure will be called a Translation Example Record.

Processing the Translation Example Records

Figure 7:
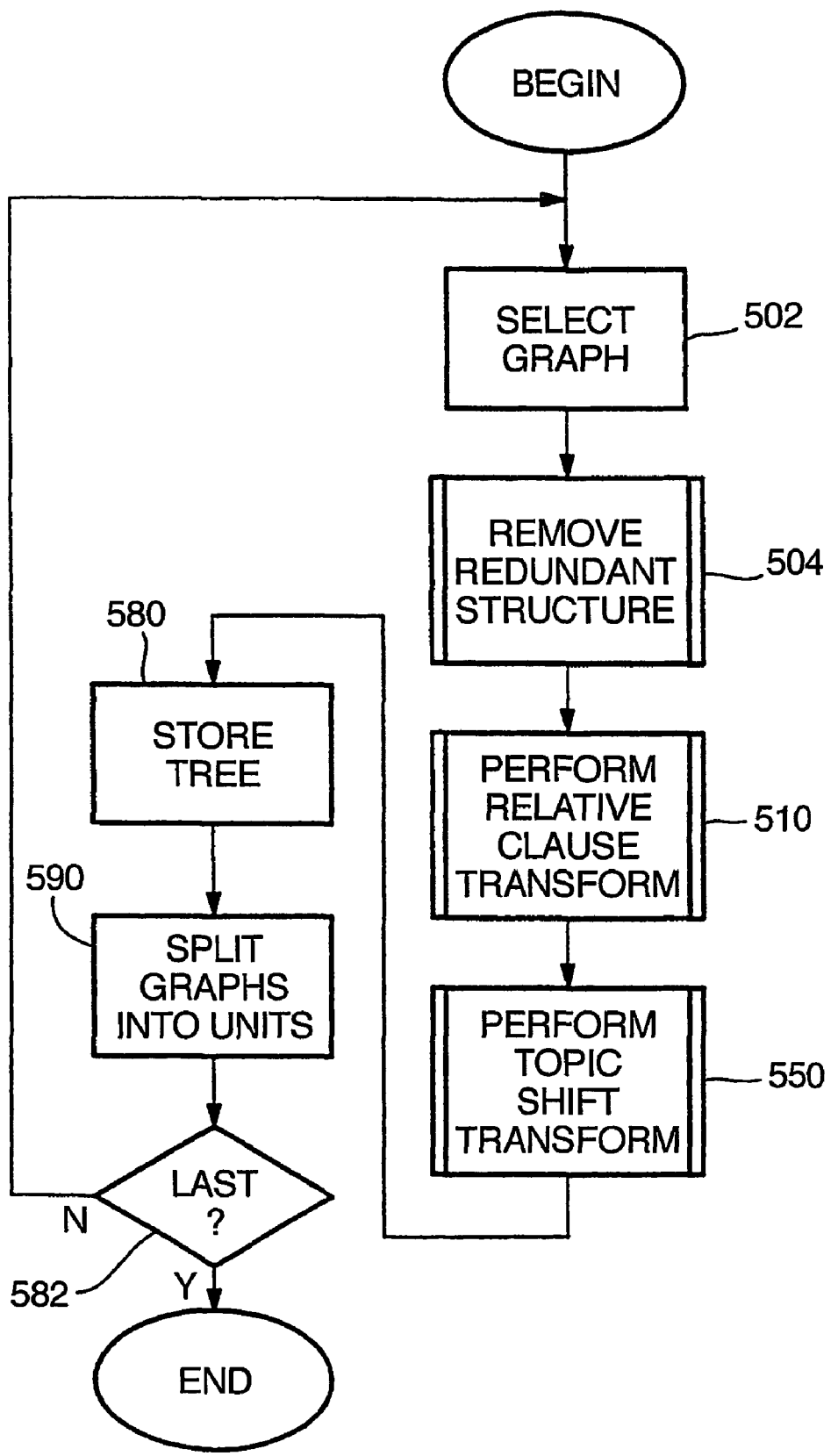
FIG. 7 is a flow diagram giving a schematic overview of the subsequent processing steps performed in a first embodiment to produce data for subsequent translation.

Referring to FIG. 7, the process performed in this embodiment by the development program 220 is as follows. In step 502, a dependency graph within a Translation Example Record is selected, and in step 504, redundant structure is removed (see below).

In step 510, a relative clause transform process (described in greater detail below) is performed. This is achieved by making a copy of the dependency graph data already generated, and then transforming the copy. The result is a tree structure.

In step 550, a topic shift transform process is performed (described in greater detail below) on the edited copy of the graph. The result is a planar tree retaining the surface order of the words, and this is stored with the original dependency graph data in step 580.

Finally, in step 590, each Translation Example Record is split into separate units which will be called Translation Units. Each Translation Unit Record consists of a pair of head words in the source and target languages, together with, for each head word, a list of surface daughters to the left of the head word (the left daughters), a list of surface daughters to the right of the head word (the right daughters) and a list of daughters in the dependency graph. Such a Translation Unit is also referred to as a translation component pair (one component for the source language and one component for the target language). In step 582, the next dependency graph is selected, until all are processed.

Removal of Redundant Layers

Figure 8:
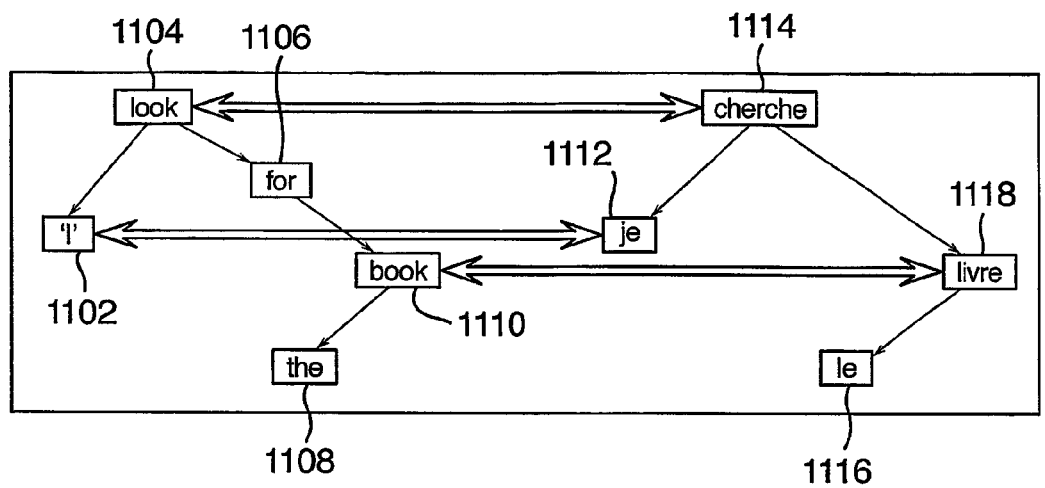
FIG. 8 shows a screen display produced by the process of FIG. 5 illustrating redundant levels.

Step 504 will now be discussed in more detail. FIG. 8 illustrates the Translation Example Record for the English phrase "I look for the book" and the French translation "Je cherche le livre".

In the English source text, the word "for" (1106) is not aligned with a word in French target text, and therefore does not define a translatable word or phrase. There is no subset of words that "for" dominates (including itself) that is a translation of a subset of words in the target language. Therefore, the fact that the word "for" dominates "book" does not assist in translation.

In this embodiment, therefore, the superfluous structure represented by "for" between "look" 1104 and "book" 1110 is eliminated. These modifications are performed directly on the dependency data, to simplify the dependency graph.

Figure 10:
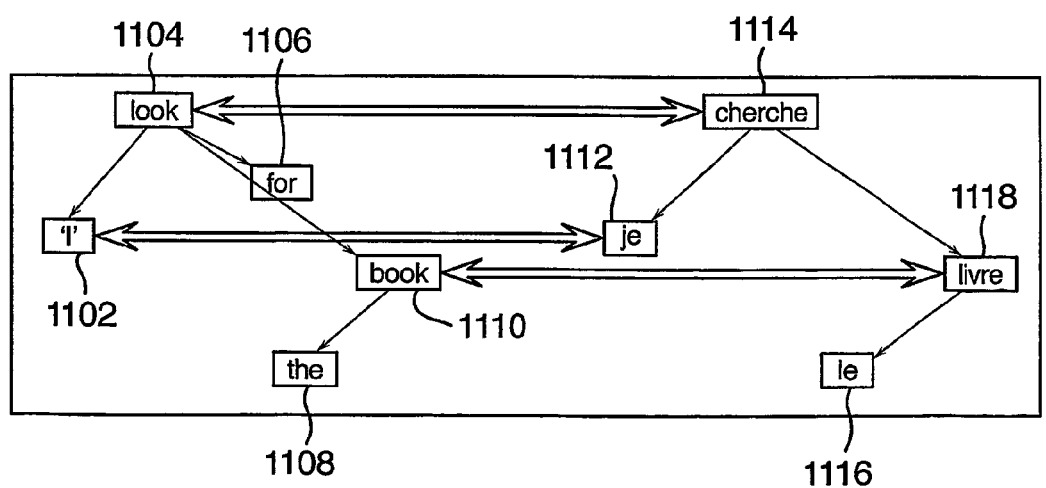
FIG. 10 illustrates a structure corresponding to that of FIG. 8 after the performance of the process of FIG. 9.
Figure 9:
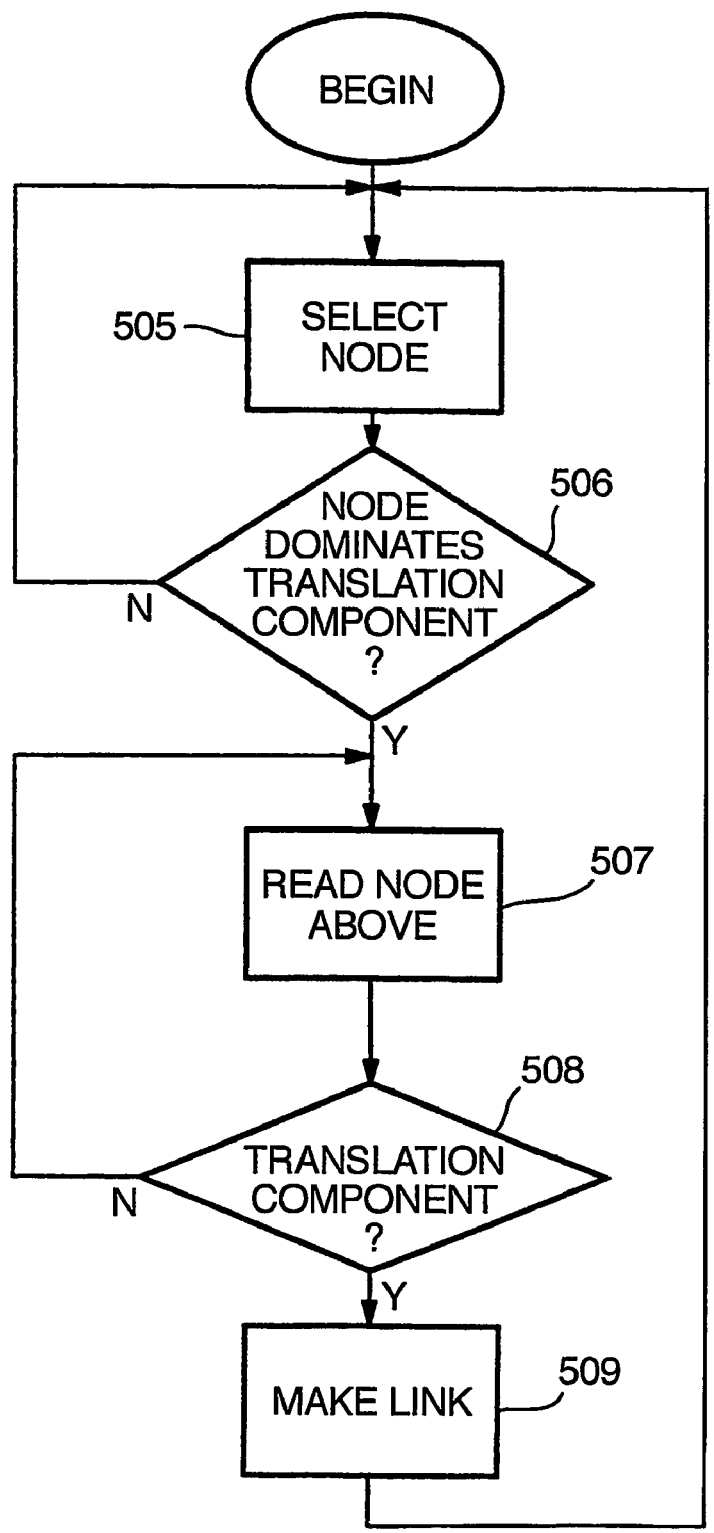
FIG. 9 is a flow diagram illustrating the process for eliminating the redundant levels of FIG. 8.

Referring to FIGS. 9 and 10, in step 505, a "leaf" node (i.e. a node which does not dominate any other) is selected and then in step 506, the next node above is accessed. If this is itself a translation node, i.e. is aligned with a node in the other language, (step 507), then the process returns to step 505 to read the next node up again.

If the node above is not aligned with a node in the other language (step 507) then the next node up again is read (step 508). If that is an aligned node (step 509), then the original node selected in step 505 is unlinked and re-attached to that aligned node (step 510). If not, then the next node up again is read (step 508) until a translation node is reached. This process is repeated for each of the nodes in turn, from the "leaf" nodes up the hierarchy, until all are processed. FIG. 10 shows the link between nodes 1106 and 1110 being replaced by a link from node 1104 to node 1110.

The removal of this redundant structure greatly simplifies the implementation of the translation system, since as discussed below each translation component can be made to consist of a head and its immediate dependents. There are no intermediate layers. This makes the translation components look like aligned grammar rules (comparable to those used in the Rosetta system), which means that a normal parser program can be used to perform the source analysis and thereby produce a translation.

This transform as just described assumes that each node in the dependency graph has an unambiguous parent. However, the dependency graph is not limited to this topology. Where there are unaligned nodes that have more than one parent, or have no parent at all, the relativisation transform (to be described later) will be carried out where necessary. This ensures that only nodes that are aligned can have other than precisely one parent.

Producing a Surface Tree

Figure 6:
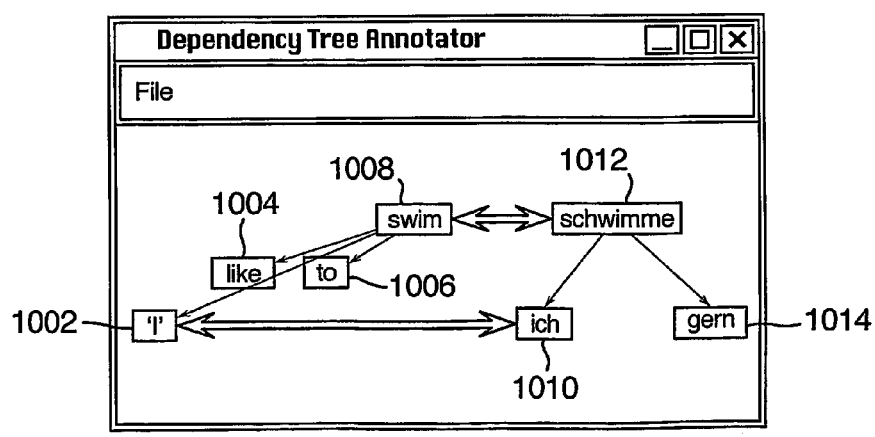
FIG. 6 shows a screen produced during the process of FIG. 5 to allow editing.

The next step performed by the development program 220 is to process the dependency graphs derived above to produce an associated surface tree. The dependency graphs shown in FIG. 6 are already in the form of planar trees, but this is not invariably the case.

The following steps will use the dependency graph to produce a surface tree structure, by making and then transforming a copy of the processed dependency graph information derived as discussed above.

Relative Clause Transformation ("Relativisation")

Figure 11:
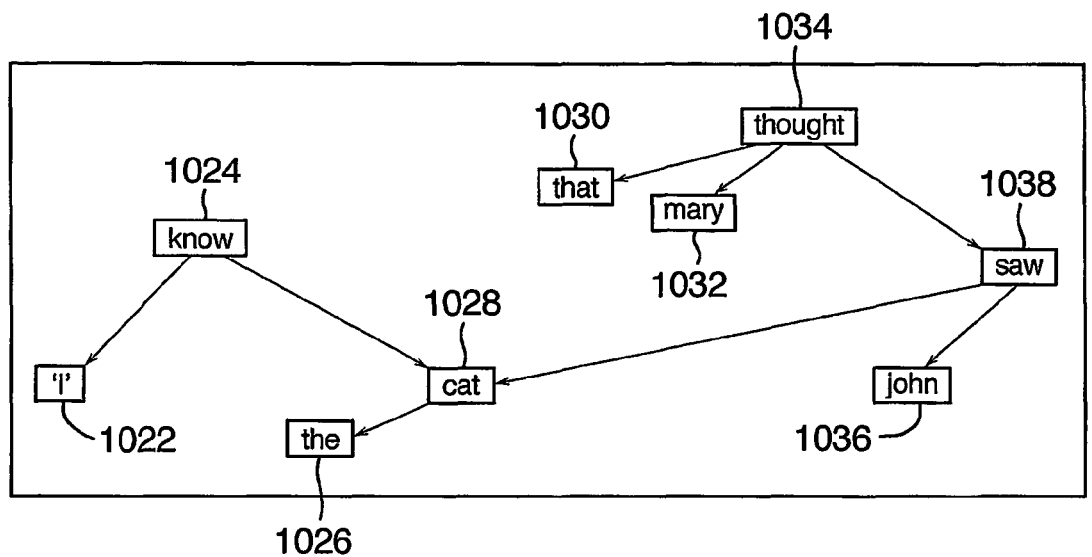
FIG. 11 shows the dependency graph produced by the process of FIG. 5 for a source text (in English) which contains a relative clause.

FIG. 11 shows the dependency graph which might be constructed by the user for the phrase "I know the cat that Mary thought John saw" in English, consisting of nodes 1022-1038. In a relative clause such as that of FIG. 11, the dependency graph will have more than one root, corresponding to the main verb ("know") and the verbs of dependent clauses ("thought"). The effect is that the dependency graph is not a tree, by virtue of having two roots, and because "cat" (1028) is dominated by two nodes ("know" (1024) and "saw" (1038)). We assume that the dependency graphs have the following properties:

they are weakly connected, directed, acyclic graphs,
for a graph with n nodes, there are n-1 links,
If nodes A and B have more than one parent, then there exists no path from A to B, or from B to A.

These assumptions imply that the dependency graphs comprise a connected set of trees, one for each clause, joined by sharing common nodes. We consider one of these trees to be the principal tree, and the root of this tree to be the principal root.

Figure 13:
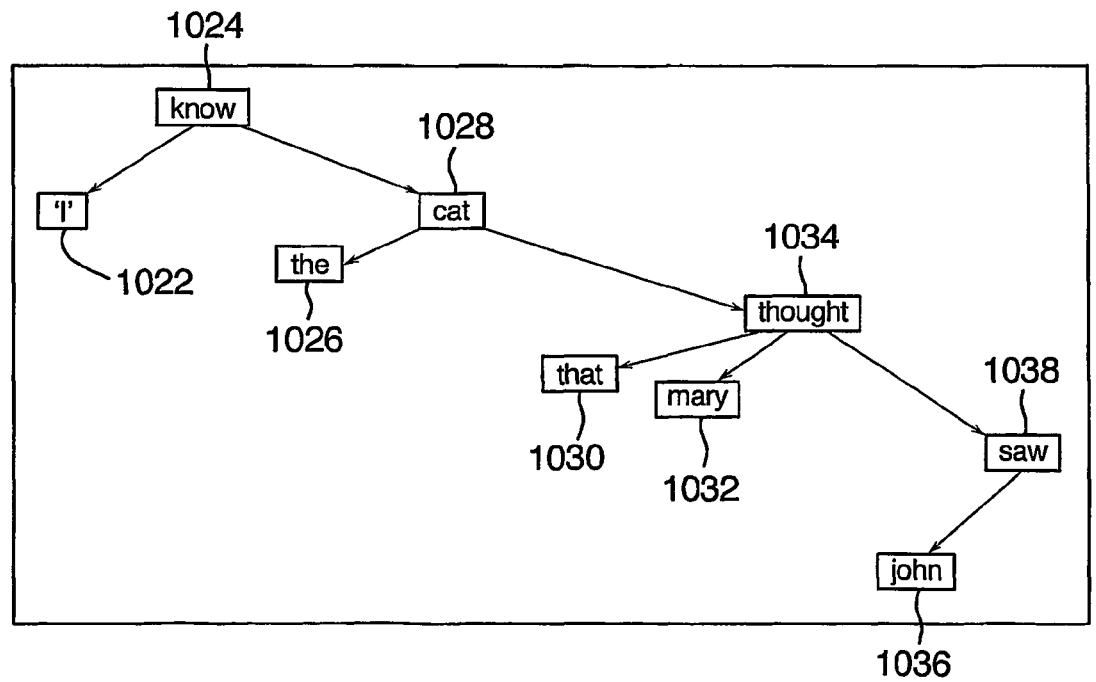
FIG. 13 corresponds to FIG. 11 and shows the structure produced by the process of FIG. 12.
Figure 12:
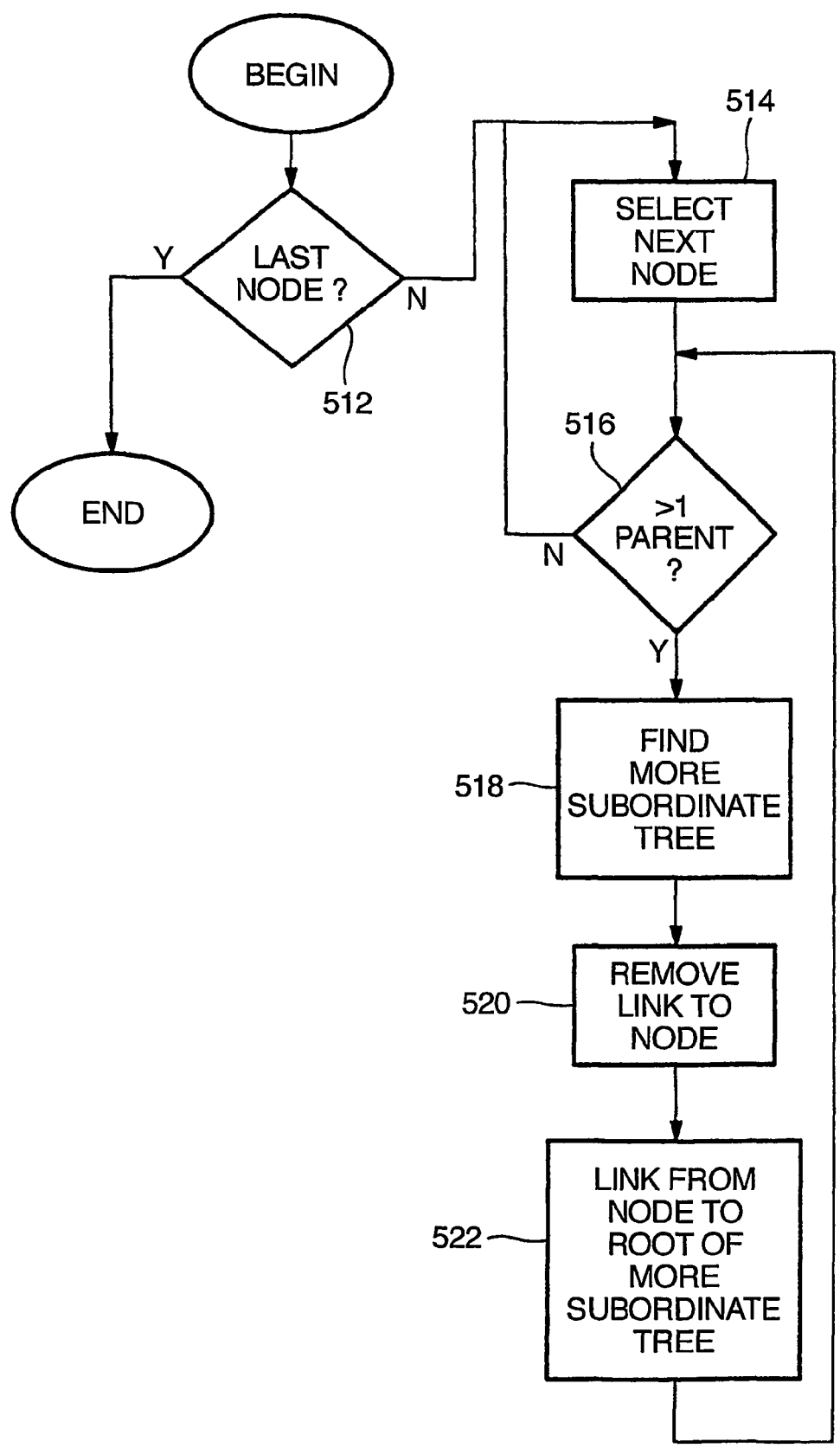
FIG. 12 is a flow diagram showing the process performed by the first embodiment on encountering such a relative clause.

Referring to FIGS. 12 and 13, an algorithm for transforming the dependency graph into a tree is then;

Start with the principal root node as the current node.
  Mark the current node as 'processed'.
  For each daughter of the current node, check whether this daughter has an unprocessed parent.
    For each such unprocessed parent, find the root node that dominates this parent (the subordinate root).
      Detach the link by which the unprocessed parent dominates the daughter and
      Insert a link by which the daughter dominates the subordinate root.
  For each daughter of the current node, make that daughter the current node and continue the procedure until there are no more nodes.

Node A is said to be a 'daughter' of node B in the case where there exists a link from B to A. Alternatively, node B is said to be a 'parent' of node A.

As FIG. 12 shows, in step 512, it is determined whether the last node in the graph has been processed, and, if so, the process ends. If not, then in step 514 the next node is selected and, in step 516, it is determined whether the node has more than one parent. Most nodes will only have one parent, in which case the process returns to step 514.

Where, however, a node such as "cat" (1028) is encountered, which has two parents, the more subordinate tree is determined (step 518) (as that node which is the greater number of nodes away from the root node of the sentence), and in step 520, the link from it (i.e. in FIG. 11, the link between 1038 and 1028) is deleted.

In step 522, a new link is created, from the node to the root of the more subordinate tree. FIG. 13 shows the link now created from the node representing "cat" (1028) to the node representing "thought" (1034).

The process then returns to step 516, to remove any further links until the node has only one parent node, at which point step 516 causes flow to return to step 514 to process the next node, until all nodes of that sentence are processed.

This process therefore has the effect of generating from the original dependency graph an associated tree structure. Thus, at this stage the Translation Example Record comprises simplified versions of the original source and target dependency graphs, together with transformed source and target graphs which now have a tree topology and retain the surface structure.

Topic Shift Transformation ("Topicalisation")

Figure 14:
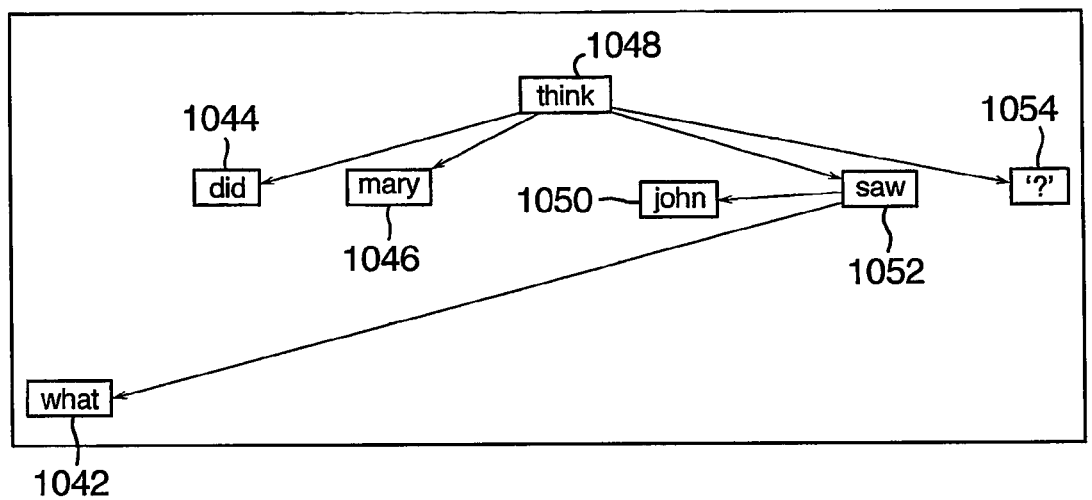
FIG. 14 shows the structure produced by the process of FIG. 5 for a source text which includes a topic shifted phrase.

The tree of FIG. 13 is a planar tree, but this is not always the case; for example where a phrase (the topic) is displaced from its "logical" location to appear earlier in the text. This occurs, in English, in "Wh-" questions, such as that shown in FIG. 14, showing the question "What did Mary think John saw?" in English, made up of the nodes 1042-1054 corresponding respectively to the words. Although the dependency graph here is a tree, it is not a planar tree because the dependency relationship by which "saw" (1052) governs "what" (1042) violates the projection constraint.

Figure 16:
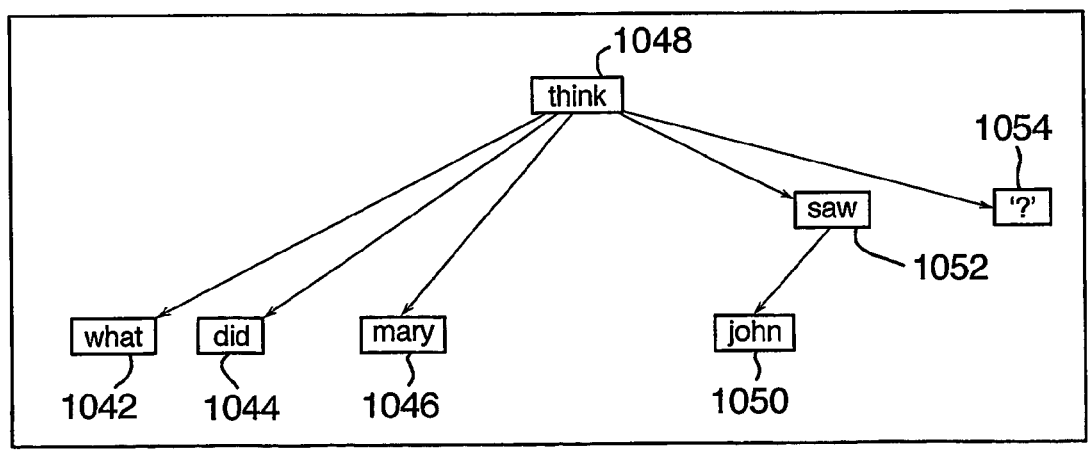
FIG. 16 corresponds to FIG. 14 and shows the structure produced by the process of FIG. 15.
Figure 15:
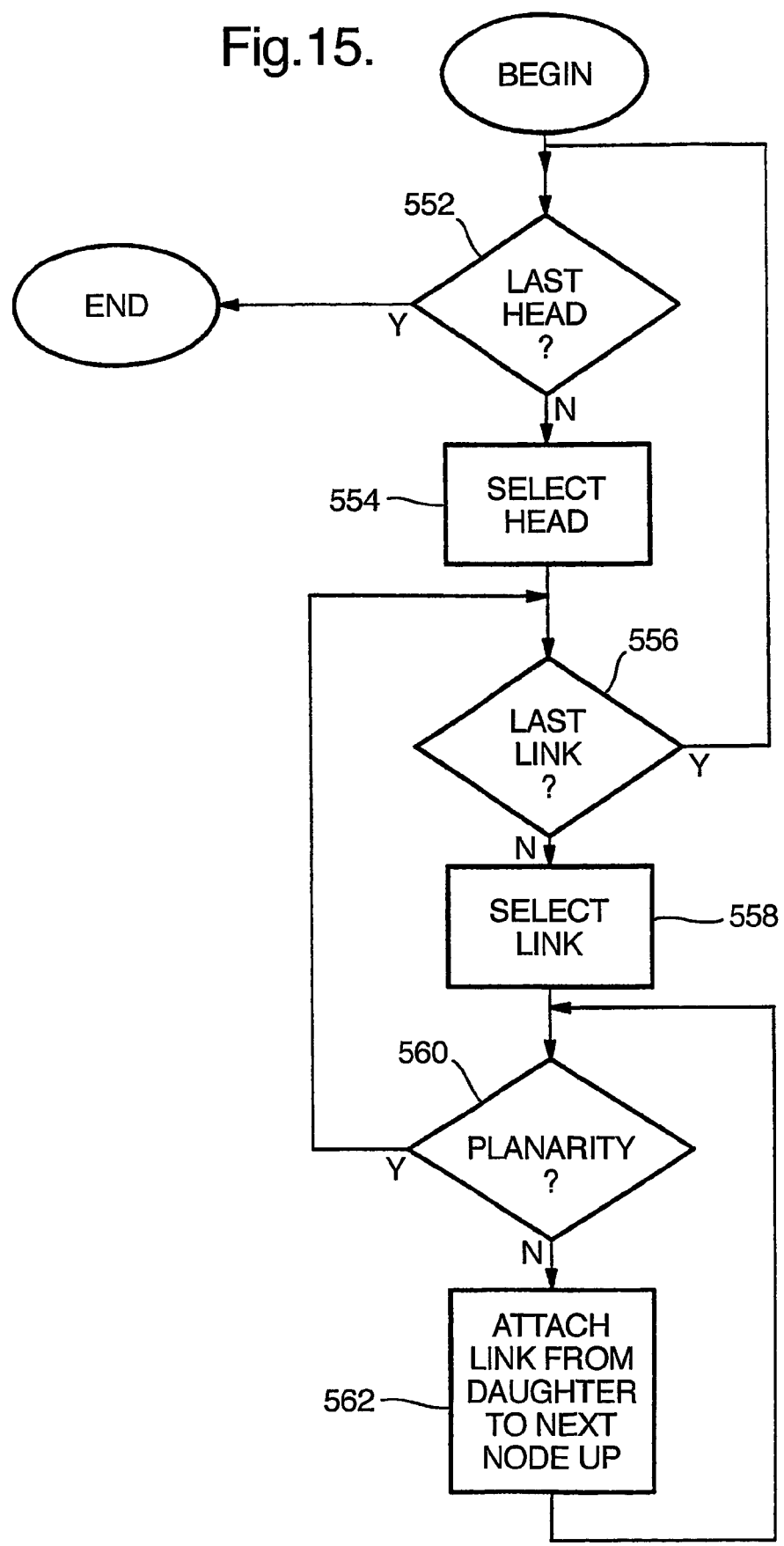
FIG. 15 is a flow diagram showing the process performed by the first embodiment in response to a topic shifted phrase.

Referring to FIGS. 14 to 16, the topic shift transform stage of step 550 will now be described in greater detail. The algorithm operates on a graph with a tree-topology, and so it is desirable to perform this step after the relativisation transform described above.

The general algorithm is, starting from a "leaf" (i.e. a node which does not dominate any other) node, For each node, (the current head), identify any daughters that violate the projection (i.e. planarity) constraint (that is, are there intervening nodes that this node does not dominate either directly or indirectly?)
  For each such daughter, remove the dependency relation (link) and attach the daughter to the parent node of the current node.
Continue until there are no more violations of the projection constraint For each node until the last (step 552), for the selected node (step 544), for each link to a daughter node until the last (step 556), a link to a daughter node (left most first) is selected (step 558). The program then examines whether that link violates the planarity constraint, in other words, whether there are intervening words in the word sequence between the head word and the daughter word which are not dominated either direct or indirectly by that node. If the projection constraint is met, the next link is selected (step 558) until the last (step 556).

If the projection constraint is not satisfied, then the link to the daughter node is disconnected and reattached to the next node up from the current node, and it is again examined (step 560) whether the planarity constraint is met, until the daughter node has been attached to a node above the current node where the planarity constraint is not violated.

The next link to a daughter node is then selected (step 558) until the last (step 556), and then the next node is selected (step 554) until the last (step 552).

Accordingly, after performing the topicalisation transform of FIG. 15, the result is a structure shown in FIG. 16 which is a planar tree retaining the surface structure, and corresponding to the original dependency graph.

Splitting the Graphs into Translation Units

After performing the relativisation and topicalisation transforms, the data record stored comprises, for each sentence, a dependency graph and a surface tree in the source and target languages. Such structures could only be used to translate new text in which those sentences appeared verbatim. It is more useful to split up the sentences into smaller translation components (corresponding, for example, to short phrases), each headed by a "head" word which is represented by an aligned node between the source and target languages.

Accordingly, in step 590, the development program 220 splits each Translation Example into translation unit records, one translation unit record for each pair of the aligned nodes.

Each translation unit record consists of a pair of head words in the source and target languages, together with, for each head word, a list of right surface daughters and a list of left surface daughters, and a list of the dependency graph daughters. These lists may be empty.

The respective head words and their associated list can be thought of as respective language components, and are paired to form the translation unit record. The language components of the translation unit may be stored together, e.g. in adjacent storage locations. Where they are stored in non adjacent storage locations they still form a single logical translation unit, by virtue of the alignment of the respective dependency data.

The fields representing the daughters may contain either a literal word ("like" for example) or a duple formed of a placeholder variable and a record of the translation unit which originally occupied that daughter field, for example, that associated with the head word pair "I"-"Ich". Also provided are additional structures which represent the relationship between the dependency and surface daughters. These will be referred to as 'gap stack operations' and will be explained further later. The effect of allowing such placeholder variables is thus that, in a translation unit such as that headed by "swim"-"schwimme" in the original sentence above, the place formerly occupied by "I"-"Ich" can now be occupied by another translation unit, allowing it to take part in other sentences such as "red fish swim". Whereas in a translation system with manually crafted rules the language units which could occupy each placeholder variable would be syntactically defined (so as to allow, for example, only a singular noun or noun phrase in a particular place), in the present embodiment there are no such constraints at this stage.

The source surface structures can now be treated as straightforward grammar rules, so that a simple chart parser can be used to produce a surface analysis tree of new texts to be translated, as will be discussed in greater detail below.

It is to be noted that, since the process of producing the surface trees might alter the dependencies of daughters upon heads, the lists of daughters within the surface trees will not identically match those within the dependency graphs in every case, since the daughter of one node might have been shifted to another in the surface tree, resulting in it being displaced from one translation component to another; the manner in which this is handled is as follows:

Where the result of forming the transformation to derive the surface structure is to displace a node in the surface representation from one translation component to another, account is taken of this by using a stack or equivalent data structure (simulated in PROLOG using pairs of lists referred to as "threads").

A gap stack operation is associated with each translation component and each surface daughter. Where the list of surface daughters in a translation component contains daughters not included in the dependency daughters, a term will be pushed onto the gap stack by one of the surface daughters. Which daughter this operation is associated with depends on the transform that led to the extra surface daughter. The term will represent either the head of the translation component (in the case of a relativisation transform) or the extra daughter (in the case of the topicalisation transform).

When a translation component contains dependency daughters which are additional to the surface daughters, a term will be popped off the gap stack associated with the translation component. This term will be unified with the additional dependency daughters.

Thus, in subsequent use in translation, when a source surface structure is matched against input source text and contains a term which cannot be accounted for by its associated dependency graph, that term is pushed on to the stack and retrieved to unify with a dependency graph of a different translation unit.

Since this embodiment is written in PROLOG, the representation between the surface tree, the gap stack and the dependency graph structure can be made simply by variable unification. This is convenient, since the relationship between the surface tree and the dependency graph structure is thereby completely bi-directional. To achieve a reverse translation, we simply reverse the two components in the translation units.

Use of a gap stack in similar manner to the present embodiment is described in Pereira F 1981, 'Extraposition Grammars', *American Journal of Computational Linguistics*, 7 4 pp. 243-256, and Alshawi H 1992, *The Core Language Engine*, MIT Press Cambridge, incorporated herein by reference.

Consider once more the topicalisation transform illustrated by the graphs in FIGS. 14 and 16. The source sides of the translation units that are derived from these graphs are (slightly simplified for clarity), component #0:
  head='think'
  left surface daughters=['what', 'did', 'mary'],
  right surface daughters=[(#1,X)]
  dependent daughters=['did', 'mary',(#1,X)]
component #1:
  head='saw',
  left surface daughters=['john'],
  right surface daughters=[ ]
  dependent daughters=['john', 'what']

It can be seen that in component #0 we have 'what' in the surface daughters list, but not in the dependant daughters list. Conversely, component #1 has 'what' in its dependent daughters list, but not in its surface daughters list.

In component #0, it was the daughter marked (#1,X) that contributed the extra surface daughter when the dependency graph to surface tree mapping took place. So, we wish to add 'what' to the gap stack for this daughter. Conversely, in component #1, we need to be able to remove a term from the gap stack that corresponds to the extra dependent daughter ('what') in order to be able to use this component at all. Therefore, the head of this component will pop a term off the gap stack, which it will unify with the representation of 'what'. The modified source side component representations then look like this, component #0:
    head='think'
        left surface daughters=['what', 'did', 'mary'],
        right surface daughters=[(#1,X):push(Gapstack, 'what')]
        dependent daughters=['did', 'mary',(#1,X)]
    component #1:
        head 'saw', pop(Gapstack, 'what'),
        left surface daughters=['john'],
        right surface daughters=[ ]
        dependent daughters=['john', 'what']

The components for a relativisation transform look a little different. To illustrate this, consider the example in FIGS. 11 and 13. In this example there will be an extra root node in the dependency structure. That means that there will be a component with an extra surface daughter and this surface daughter will cause the head of the component to be pushed onto the gap stack. In this example, 'cat' is the head of the relevant component and 'thought' is the surface daughter (of 'cat') that will push the representation of 'cat' onto its gap stack. This will have the effect of making 'thought' a local root in the dependency graph, and making 'cat' a dependent daughter of whichever head pops it off the gap stack (in this case 'saw').

The representation then for the source side of the graphs in FIGS. 11 and 13 are (again simplified for clarity),
    component #0:
        head='know'
        left surface daughters=['I'],
        right surface daughters=[(#1,Y)]
        dependent daughters=['I',(#1,Y)]
    component #1:
        head='cat',
        left surface daughters=['the' ],
        right surface daughters=[(#2,Z):push(Gapstack,'cat')]
        dependent daughters=['the' ]
    component #2:
        head='thought',
        left surface daughters=['that','mary'],
        right surface daughters=[(#3,W)],
        dependent daughters=['that','mary',(#3,W)]
    component=#3:
        head='saw':pop(Gapstack,V),
        left surface daughters=['john'],
        right surface daughters=[ ],
        dependent daughters=['john',V]

This example shows 'cat' being added to the gap stack for the daughter #2 of component #1. Also, a term (in this case a variable) is popped off the gapstack at the head of component #3. This term is unified with the dependent daughter of component #3.

In the present invention, the term "language unit" encompasses both words and placeholder variables, and the term "word" encompasses actual or literal words and morphemes.

Thus, in the above example, for component #0, its left surface daughter is the actual word 'I', and its right surface daughter is a duple formed of a placeholder variable 'Y' and a record of the translation unit which originally occupied that daughter field '#1'; for component #1, its left surface daughter is the actual word 'the', and its right surface daughter is a duple formed of a placeholder variable 'Z' and a record of the translation unit which originally occupied that daughter field '#2'; for component #2, its left surface daughters are the actual words 'that' and 'mary', and its right surface daughter is a duple formed of a placeholder variable 'W' and a record of the translation unit which originally occupied that daughter field '#3'; and for component #3, its left surface daughter is the actual word 'john', it has no right surface daughter, but because of the term popped off the gap stack its dependent daughters are the actual word 'john' and a variable having the value "V".

If there exists another component, say #21, for 'the black dog', i.e. head='dog'; left surface daughters='the' and 'black', then all occurrences of the placeholder variable associated with #1 can be instantiated to #21 to produce another translatable source text.

Translation

Further aspects of the development program will be considered later. However, for a better understanding of these aspects, it will be convenient at this stage to introduce a description of the operation of the translation program 230. This will accordingly be discussed.

The source surface structures within the translation components are treated in this embodiment as simple grammar rules so that a surface analysis tree is produced by the use of a simple chart parser, as described for example in James Allen, "Natural Language Understanding", second edition, Benjamin Cummings Publications Inc., 1995, but modified to operate from the head or root outwards rather than from right to left or vice versa. The parser attempts to match the heads of source surface tree structures for each translation unit against each word in turn of the text to be translated. This produces a database of packed edges using the source surface structures, which is then unpacked to find an analysis.

The effect of providing a unification of the surface tree terms and the dependency tree terms using the stack ensures that the source dependency structure is created at the same time during unpacking.

Figure 17:
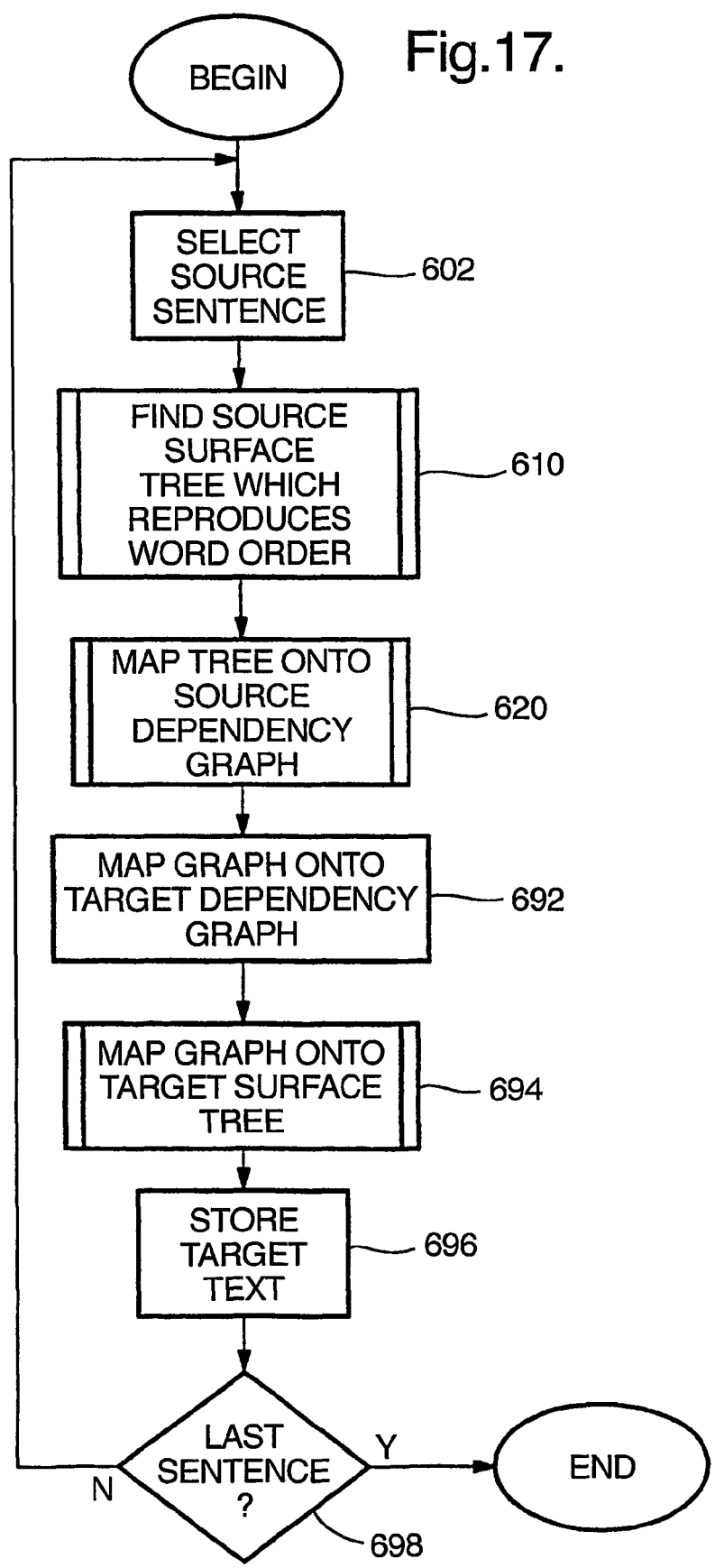
FIG. 17 is a flow diagram showing an overview of the translation process performed by the embodiment of FIG. 1.

Whilst the actual order of implementation of the rules represented by the surface and dependency structures is determined by the logic interpreter 239, FIGS. 17 and 18 notionally illustrate the process.

In a step 602 of FIG. 17, a sentence of the source language file to be translated is selected. In step 610, a source surface tree of a language component is derived using the parser, which reproduces the word order in the input source text. In step 620, the corresponding dependency graph is determined. In step 692, from the source dependency graph, the target dependency graph is determined. In step 694, from the target dependency graph, the target surface tree is determined, and used to generate target language text, in step 696, the target language text is stored. The process continues until the end of the source text (step 698).

Figure 18A:
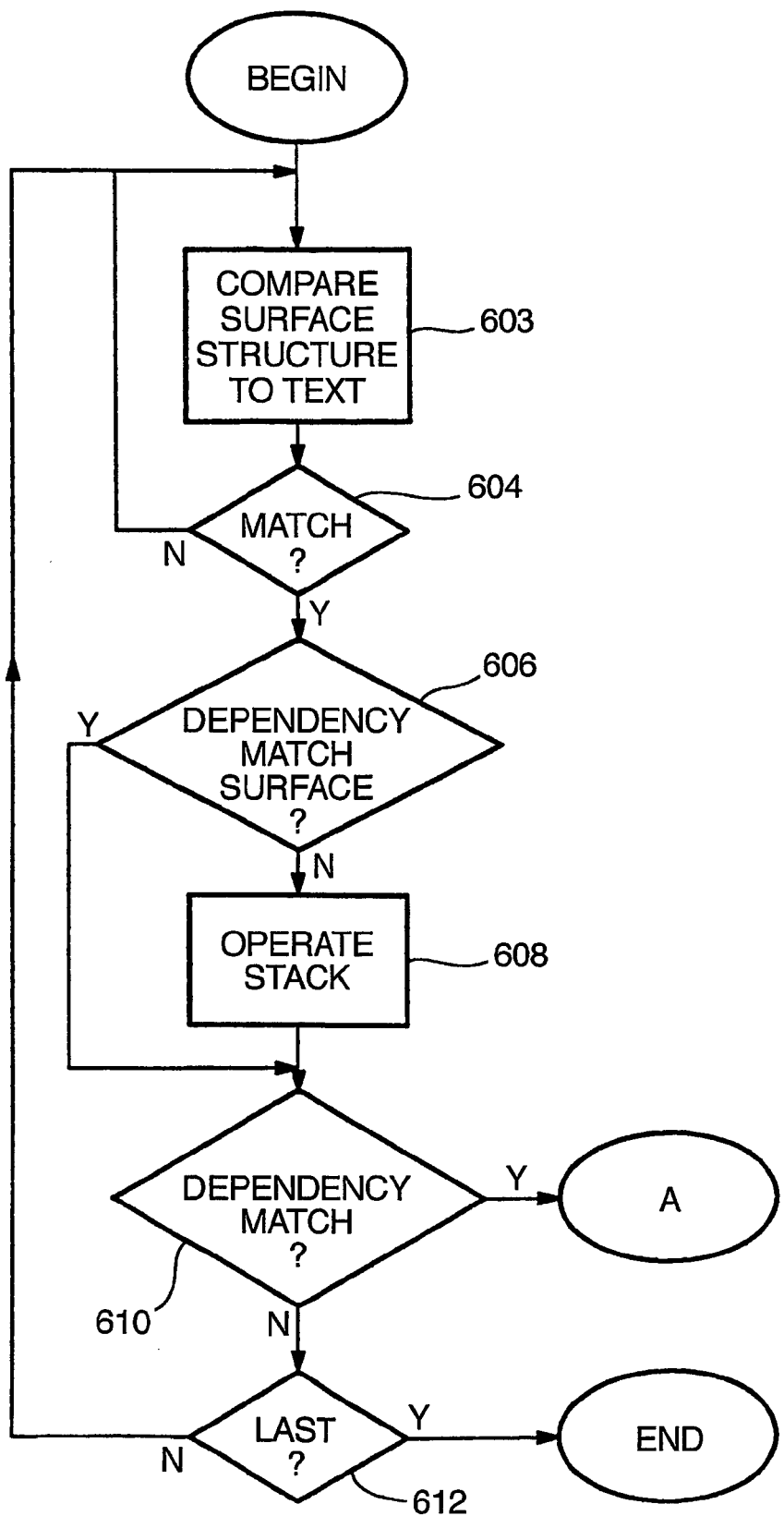
FIG. 18 (comprising FIGS. 18a and 18b) is a flow diagram showing in more detail the translation process of the first embodiment.
Figure 18B:
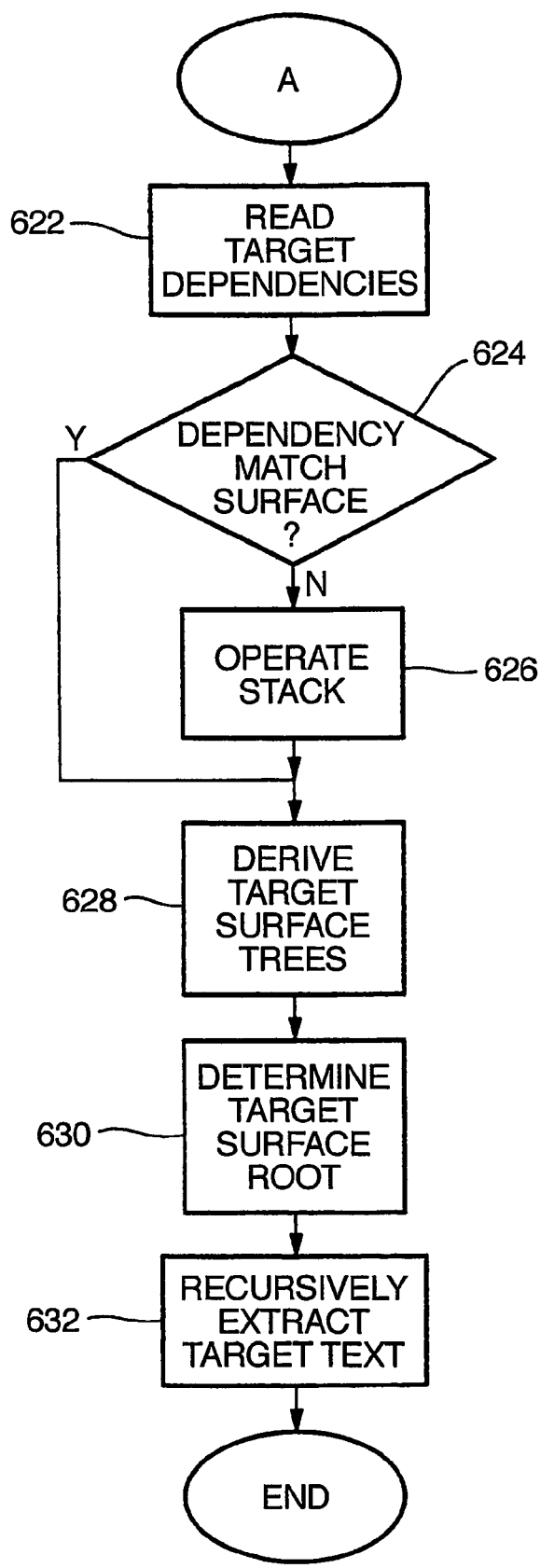

FIGS. 18a and 18b illustrate steps 610 to 694 in greater detail. In step 603, each surface structure is compared in turn with the input text. Each literal surface daughter node (node storing a literal word) has to match a word in the source text string exactly. Each aligned surface daughter (i.e. surface daughter corresponding to a further translation unit) is unified with the source head record of a translation unit, so as to build a surface tree for the source text.

Then, for each translation unit in the surface analysis, using the stored stack operations for that unit, the stack is operated (step 608) to push or pop any extra or missing daughters. If (step 610) the correct number of terms cannot be retrieved for the dependency structure then the candidate structure is rejected and the next selected until the last (step 612). Where the correct translation components are present, exactly the correct number of daughters will be passed through the stack.

Where a matching surface and dependency structure (i.e. an analysis of the sentence) is found (step 610), then, referring to FIG. 18b, for each translation unit in the assembled dependency structure, the corresponding target head nodes are retrieved (step 622) so as to construct the corresponding target dependency structure. The transfer between the source and target languages thus takes place at the level of the dependency structure, and is therefore relatively unaffected by the vagaries of word placement in the source and/or target languages.

In step 626 the stack is operated to push or pop daughter nodes. In step 628, the target surface structure is determined from the target dependency structure.

In step 630, the root of the entire target surface structure is determined by traversing the structure along the links. Finally, in step 632, the target text is recursively generated by traversing the target surface structure from the target surface root component, to extract the target text from the target surface head and daughter components.

From the above description, it will be understood that the present invention distinguishes from the previously mentioned work in this field, e.g. Sato's MBT2, by the use of two different graphs to represent the example texts of each language. One of the graphs is a planar tree for expressing monolingual surface constraints, such as word ordering and agreement rules; the other is a more general directed acyclic graph providing a dependency graph for the example text. The alignment between the two languages is expressed as an alignment between the dependency graphs.

One advantage of the present invention is that discontiguous sequences of words can be aligned. Another advantage is that words which exhibit mutual restrictions are 'neighbours' in the representation. This allows constraints to be learnt from very small numbers of examples.

Second Embodiment

Generalisation of Translation Units

Having discussed the central operation of the first embodiment, further preferred features (usable independently of those described above) will now be described.

Translation components formed by the processes described above consist, for the target and source languages, of a literal head and a number of daughters which may be either literal or non-literal (i.e. the duples mentioned above), the latter representing connection points for other translation components. Using a translation component, each of the literal daughters has to match the text to be translated exactly and each of the non-literal daughters has to dominate another translation component.

The set of rules (which is what the translation unit records now comprise) were derived from example text. Accordingly, the example of a particular noun, with, say, one adjective cannot be used to translate that noun when it occurs with zero or two or more, adjectives. The present embodiment provides a means of generalising from the examples given. This reduces the number of examples required for an effective translation system or, viewed differently, enhances the translation capability of a given set of examples.

Figure 19A:
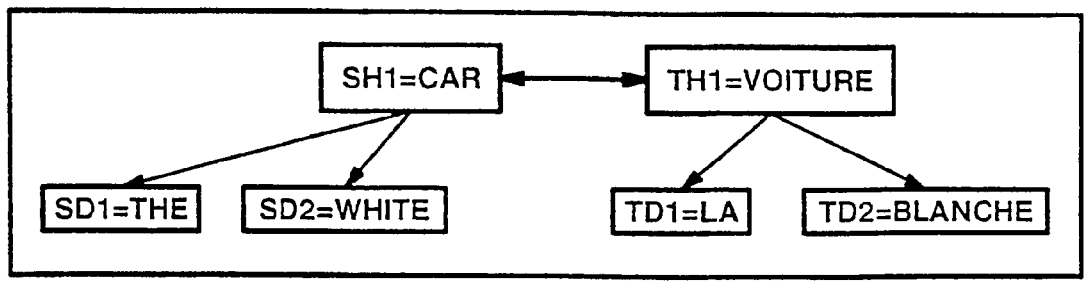
FIGS. 19a-19f show translation components used in a second embodiment of the invention to generate additional translation components for generalisation.
Figure 19B:
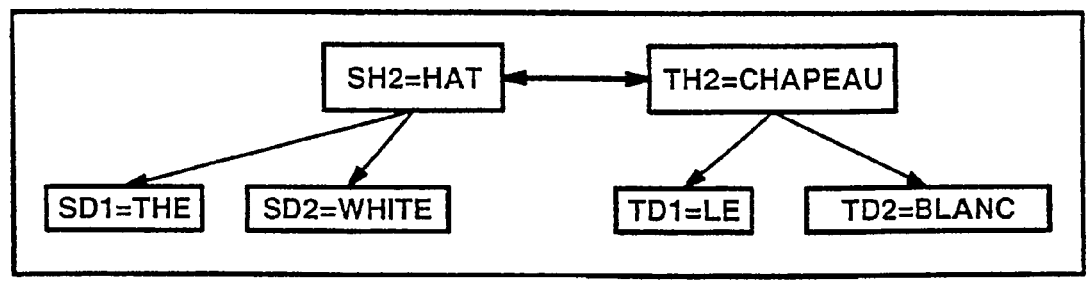

FIG. 19 (comprising FIGS. 19a-19f) shows six example texts of French-English translation units; in FIG. 19a the source head is "car", with left daughters "the" and "white", and the target head is "voiture" with left daughter "la" and right daughter "blanche"; similarly FIG. 19b shows the text "the white hat" ("Le chapeau blanc"); FIG. 19c shows the text "the car" ("la voiture"); FIG. 19d shows the text "the hat" ("le chapeau"); FIG. 19e shows the text "the cat" ("le chat"); and FIG. 19f shows the text "the mouse" ("la souris").

On the basis of only these example texts, the translation system described above would be unable to translate phrases such as the "white mouse" or the "white cat".

Generalisation, to allow the system to translate such examples, is performed by adding "pseudo-translation units" to reduce the number of distinct behaviours of head word pairs as will now be described.

From each translation unit, we derive an alternation. This consists of the translation unit, with the head words removed. Two alternations are said to be analogous if they can be made identical by renaming the placeholder variables and references (values) to translation units contained in them. For each head word pair there will be a set of alternations. We consider this set to describe the 'behaviour' of the head word pair. Two head word pairs are said to behave in an analogous way if a significant number of the alternations that describe their behaviours are analogous. To allow the required generalisation, we create new translation units (pseudo-translation units) to make the behaviours of analogous head word pairs identical.

Figure 20:
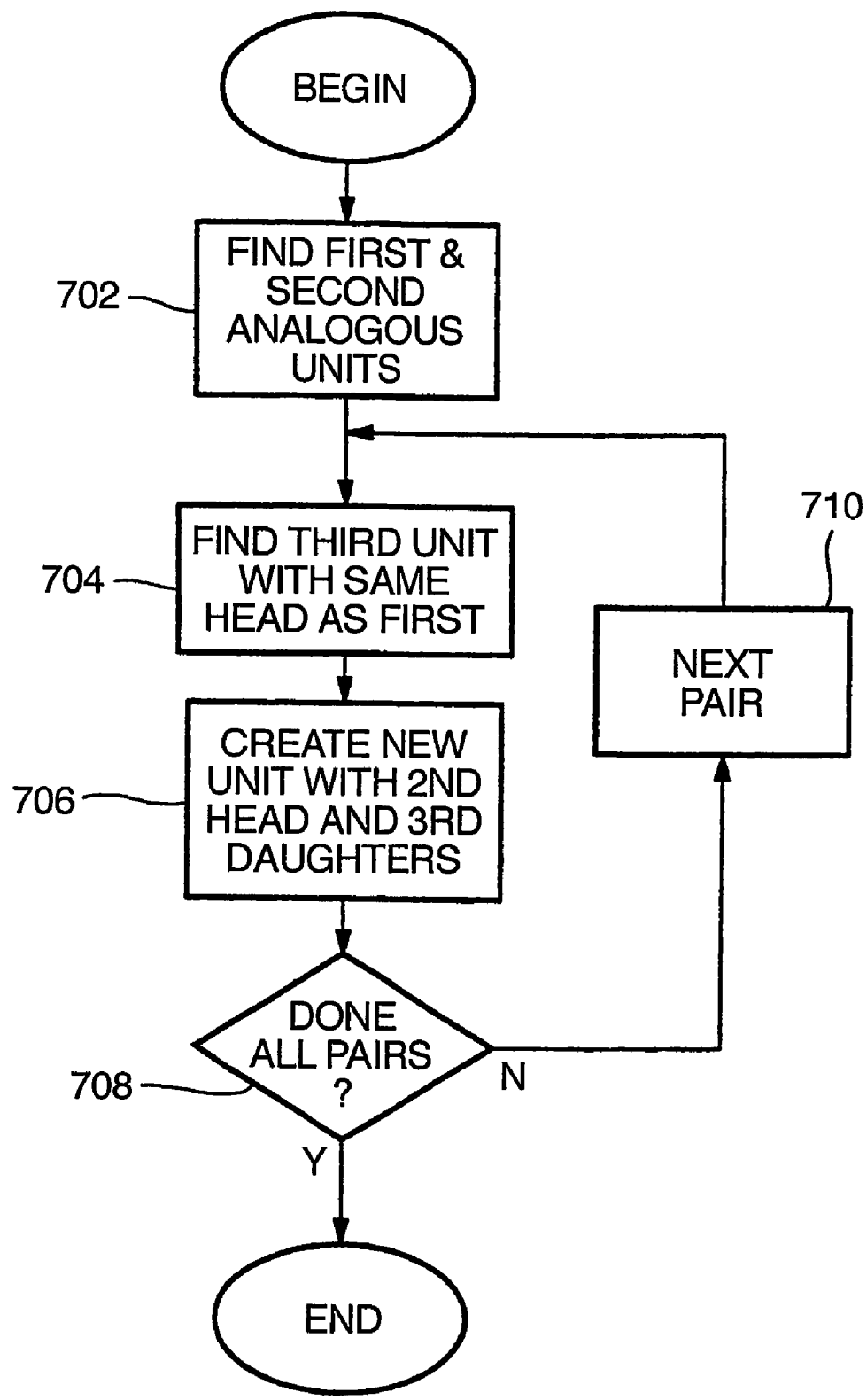
FIG. 20 is a flow diagram showing the process by which such additional components are created in the second embodiment.

Referring to FIG. 20, in a step 702, the development program 220 reads the translation units stored in the store 232 to locate analogous units. To determine whether two translation units are analogous, we check that their alternations are analogous.

Figure 19C:
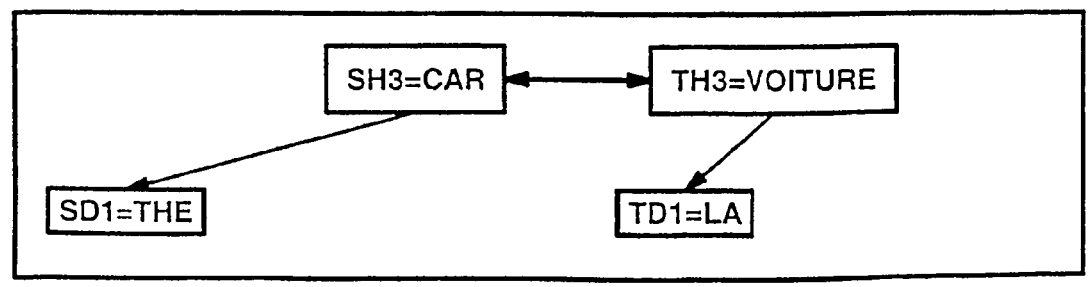
Figure 19D:
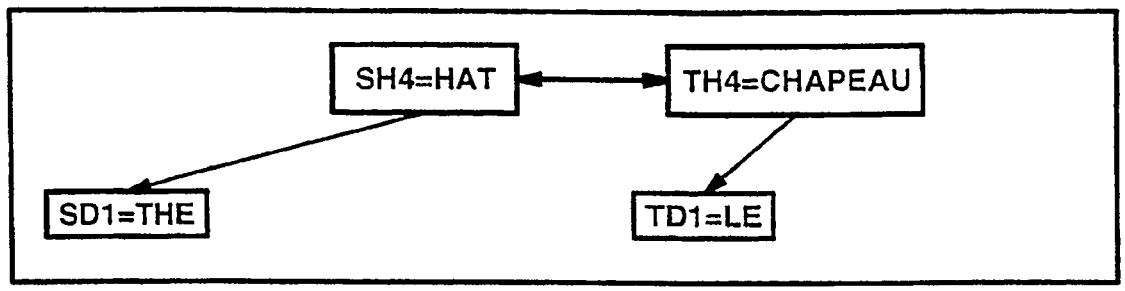
Figure 19E:
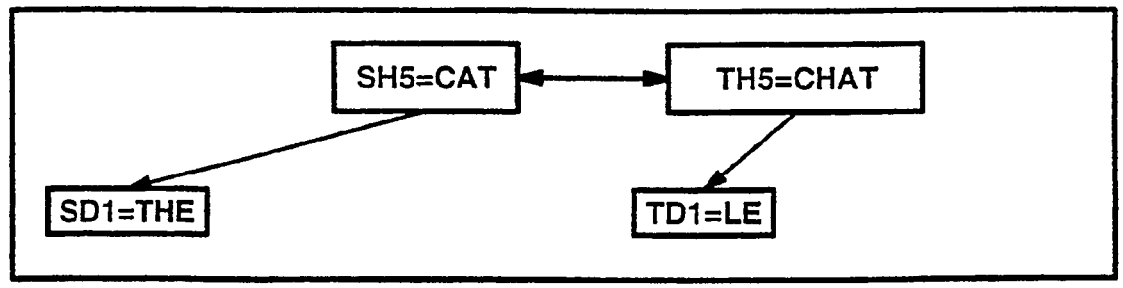
Figure 19F:
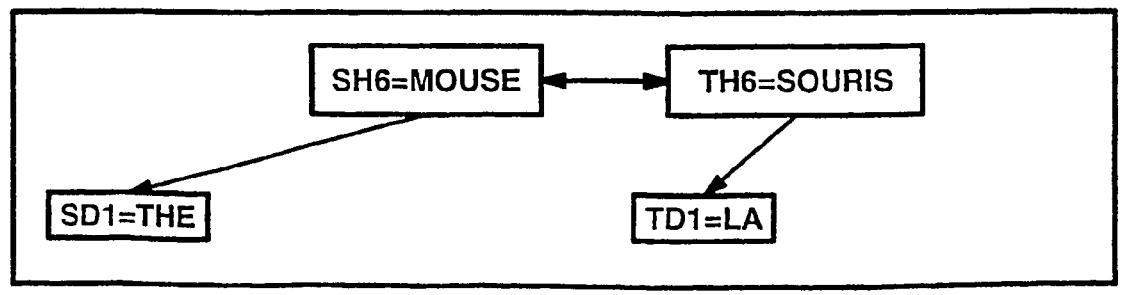

Referring to the translation examples in FIGS. 19a to 19f, the unit shown in FIG. 19d will be found to be analogous to that of FIG. 19e and the unit shown in FIG. 19c is analogous to that shown in FIG. 19f. Although the source sides of all four are equivalent (because the definite article in English does not have masculine and feminine versions) the two pairs are not equivalent in their target daughter list.

For each pair of analogous translation units that were identified which differ in their source and target head words, a third translation unit is created in step 704 which has the same source-target head word pair as one of the pair of analogous translation units, but different daughters. For example, in relation to the pair formed by FIGS. 19d and 19e, FIG. 19b would be selected in step 704 since it has the same head words as the unit of FIG. 19d.

In step 706, a new translation unit record is created which takes the source and target head words of the other of the pair of analogous translation units (in other words not the head words of the third translation unit), combined with the list of daughters of the third translation unit. In this case, the translation unit generated in step 706 for the pair of analogous translation units of FIGS. 19d and 19e using the translation unit of FIG. 19b would be;

SH7=Cat
SD1=The
SD2=White
TH7=Chat
TD1=Le
TD2=Blanc

Similarly, the new translation unit formed from the pair of analogous translation units of FIGS. 19c and 19f using the translation unit of FIG. 19a would be as follows;

SH8=Mouse
SD1=The
SD2=White
TH8=Souris
TD1=La
TD2=Blanche

Accordingly, the translation development program 220 is able to generate new translation examples, many of which will be syntactically correct in the source and target languages.

In the above examples, it will be seen that leaving the function words, such as determiners ("the", "le", "la") as literal strings in the source and target texts of the examples, rather than marking them up as language units, has the benefit of preventing over-generalisation (e.g. ignoring adjective-noun agreements).

Although the embodiment as described above functions effectively, it could also be possible in this embodiment to make use of the source and target language lexicons 234, 236 to limit the number of pairs of translation units which are selected as analogous.

For example, pairs might be considered analogous only where the source head words, likewise the target head words, of the two are in the same syntactic category. Additionally or alternatively, the choice of third unit might be made conditional on the daughters of the third unit belonging to the same syntactic category or categories as the daughters of the first and second units. This is likely to reduce the number of erroneous generalised pairs produced without greatly reducing the number of useful generalisations.

Where the generalisation of the above described embodiment is employed with the first embodiment, it is employed after the processes described in FIG. 7. It is convenient to associate a penalty with the use of pseudo-translation units during translation, to deter the translation system from using these when other translations are available.

It will be appreciated that the generalisation method of this second embodiment distinguishes from the previously mentioned work in this field by using analogies between word behaviours to hypothesis new translation units that were not seen in the examples.

Third Embodiment

Creating and Using Head/Daughter Restrictions

If, as described in the first embodiment, any daughter may select any head during translation, many incorrect translations will be produced (in addition to any correct translations which may be produced). If the generalisation process described in the preceding embodiments is employed, this likelihood is further increased. If a number of translations would be produced, it is desirable to eliminate those which are not linguistically sound, or which produce linguistically incorrect target text.

A translation system cannot guarantee that the source text itself is grammatical, and so the aim is not to produce a system which refuses to generate ungrammatical target text, but rather one which, given multiple possible translation outputs, will result in the more grammatically correct, and faithful, one.

The system of the present embodiments does not, however, have access to syntactic or semantic information specifying which heads should combine with which daughters. The aim of the present embodiment is to acquire data to perform a similar function to such syntactic or semantic information by generalising the combinations of translation units which were present, and more specifically, those which cannot have been present, in the example texts.

Accordingly, in this embodiment, the data generated by the development program 220 described above from the marked up source and target translation text is further processed to introduce restrictions on the combinations of head and daughter translation units which are permitted during the translation process.

Inferring Restrictions

Accordingly, in this embodiment, restrictions are developed by the development program 220.

Figure 21:
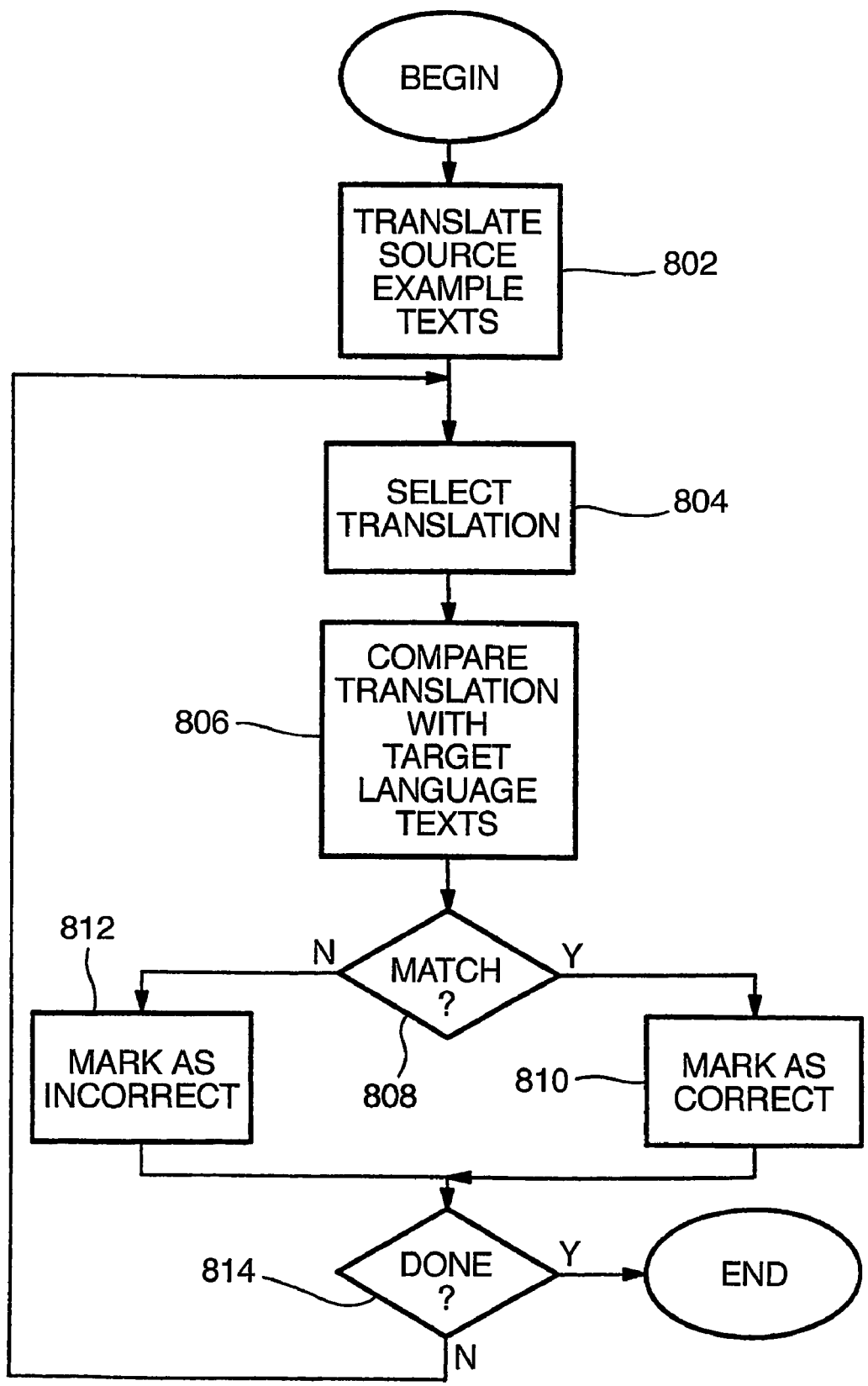
FIG. 21 is a flow diagram showing the first stage of the process of generating restrictions between possible translation unit combinations according to a third embodiment.

Referring to FIG. 21, in a step 802 the development program 220 causes the translator program 230 to execute on the source and the target language example texts stored in the files 224, 226.

Where the translation apparatus is intended to operate only unidirectionally (that is from the source language to the target language) it will only be necessary to operate on the source language example texts, but it will be apparent that in a bidirectional translation system, as in this embodiment, the process is also performed in the other direction.

In step 804, one of the translations (there are likely to be several competing translations for each sentence) is selected and is compared with all of the target example texts. If the source-target text pair produced by the translation system during an analysis operation appears in any of the examples (step 808) that analysis is added to a "correct" list (step 810). If not it is added to an "incorrect" list (step 812).

If the last translation has not yet been processed (step 814), the next is selected in step 804. The process is then repeated for all translations of all source text examples.

The goal of the next stage is to eliminate the incorrect analyses of the example texts.

Figure 22:
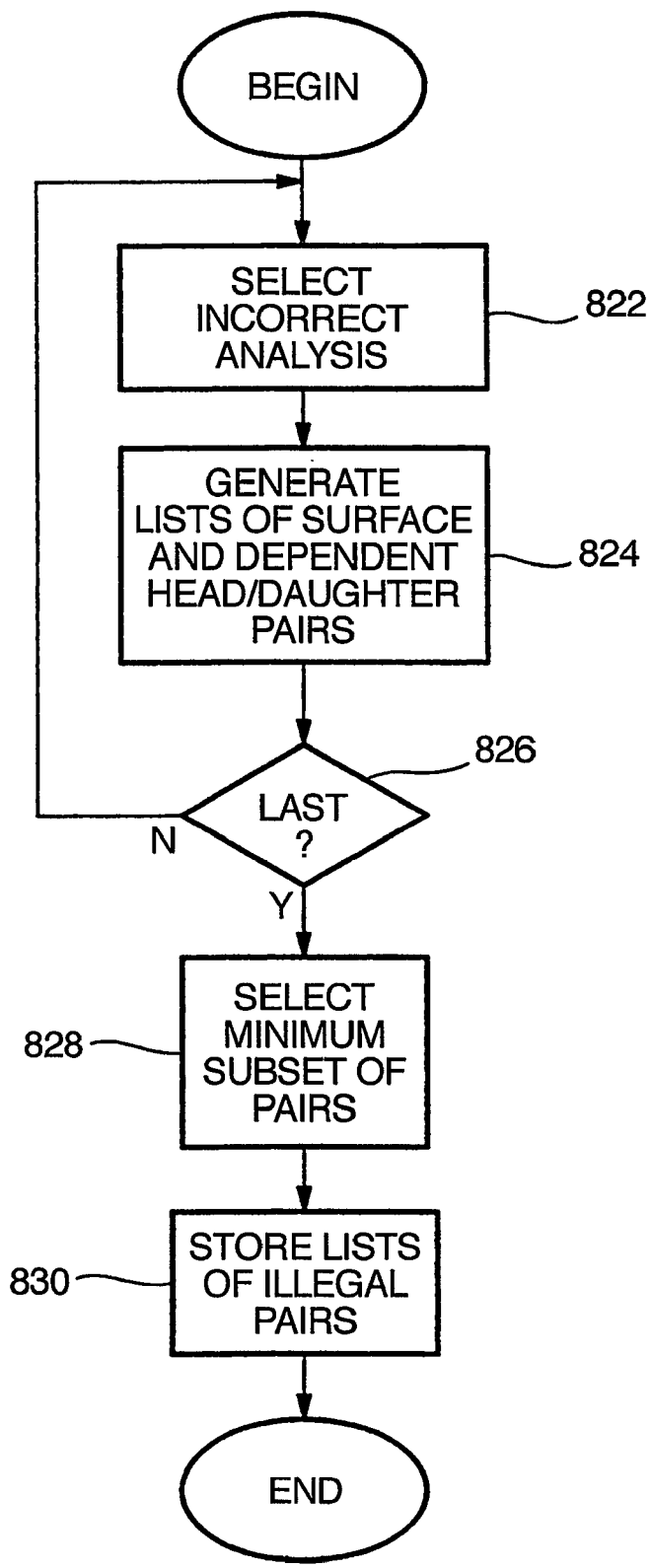
FIG. 22 is a flow diagram showing the second stage in the process of the third embodiment.

Accordingly, referring to FIG. 22, each incorrect analysis from the list produced by the process of FIG. 21 is selected (step 822), and in step 824, the source analysis surface structure graph (tree) and the source analysis dependency structure are traversed to produce separate lists of the pairs of heads and daughters found within the structure. The result is a list of surface head/daughter pairs for source and target texts and a list of dependent head/daughter pairs (common to both languages). The three lists will be different in general since, as noted above, the surface and dependent daughters are not identical for many translation units.

This process is repeated for each analysis until the last is finished (step 826).

Having compiled surface and dependent head/daughter pair sets for each incorrect analysis, in step 828, a subset of head/daughter pairs is selected, so as to be the smallest set which, if disabled, would remove the largest number of (preferably all) incorrect analyses.

It will be recalled that when the original graphs were separated into translation components, the identities of the components occupying the daughter positions were stored for each. So as to avoid eliminating any of the head/daughter pairs which actually existed in the annotated source-target examples, these original combinations are removed from the pair lists.

The process of finding the smallest subset of head/daughter pairs to be disabled which would eliminate the maximum of the incorrect analyses is performed by an optimisation program, iteratively determining the effects of those of the head/daughter pairs which were not in the original examples.

It could, for example, be performed by selecting the head/daughter pair which occurs in the largest number of incorrect translations and eliminating that; then, of the remaining translations, selecting the head/daughter pair which occurred in the largest number and eliminating that; and so on, or, in some cases a "brute force" optimisation approach could be used.

The product of this step is therefore three lists (one for each of the source and target representations and one for the common dependency representation) of pairs of head words and daughter words which cannot be combined.

Thus, these lists could, at this stage, be stored for subsequent use in translation so that during the analysis phase of translation, the respective combinations are not attempted, thus reducing the time taken to analyse by reducing the number of possible alternative analyses, and eliminating incorrect analyses.

Having found and marked the pairs as illegal in step 830, however, it is then preferred to generalise these restrictions on head/daughter pairing to be able to select between competing analyses for, as yet, unseen source texts beyond those stored in the example files 224.

To do this, a principle is required which is capable of selecting the "best" generalisation from amongst all those which are possible. According to this embodiment, the preferred generalisation is that which is simplest (in some sense) and which remains consistent with the example data.

This is achieved as follows: A data structure is associated with each translation unit and each aligned daughter; in this embodiment, it is an attribute-value matrix (as is often used to characterise linguistic terms) although other structures could be used.

An aligned daughter may only dominate a translation unit if the associated data structures "match" in some sense (tested for example by PROLOG unifications).

The restrictions are generalised by choosing to minimise the numbers of distinct attribute-value matrices required to produce translations which are consistent with the original translation examples. A daughter can only select a particular head during translation if the head and daughter attribute-value matrices can be unified. Two translation units can share the same attribute value matrices if and only if the sets of translation units to which they cannot connect are identical. Therefore, to minimise the number of attribute value matrices, we wish to minimise the number of distinct sets of heads that daughters cannot connect to, and the number of distinct set of daughters that heads cannot connect to. The objective therefore, is to add additional illegal head/daughter pairs to reduce the number of such distinct sets.

In the following process, therefore, the principle followed is that where a first head cannot combine with a first set of daughters, and a second head cannot combine with a second set of daughters, and there is a high degree of overlap between the two lists of daughters, then the two heads are likely to behave alike linguistically, and accordingly, it is appropriate to prevent each from combining with all of the daughters with which the other cannot combine.

Exactly the same is true for the sets of heads for which each daughter cannot combine. The effect is thus to coerce similar heads into behaving identically and similar daughters into behaving identically, thus reducing the number of different behaviours, and generalising behaviours from a limited set of translation examples.

Figure 23A:
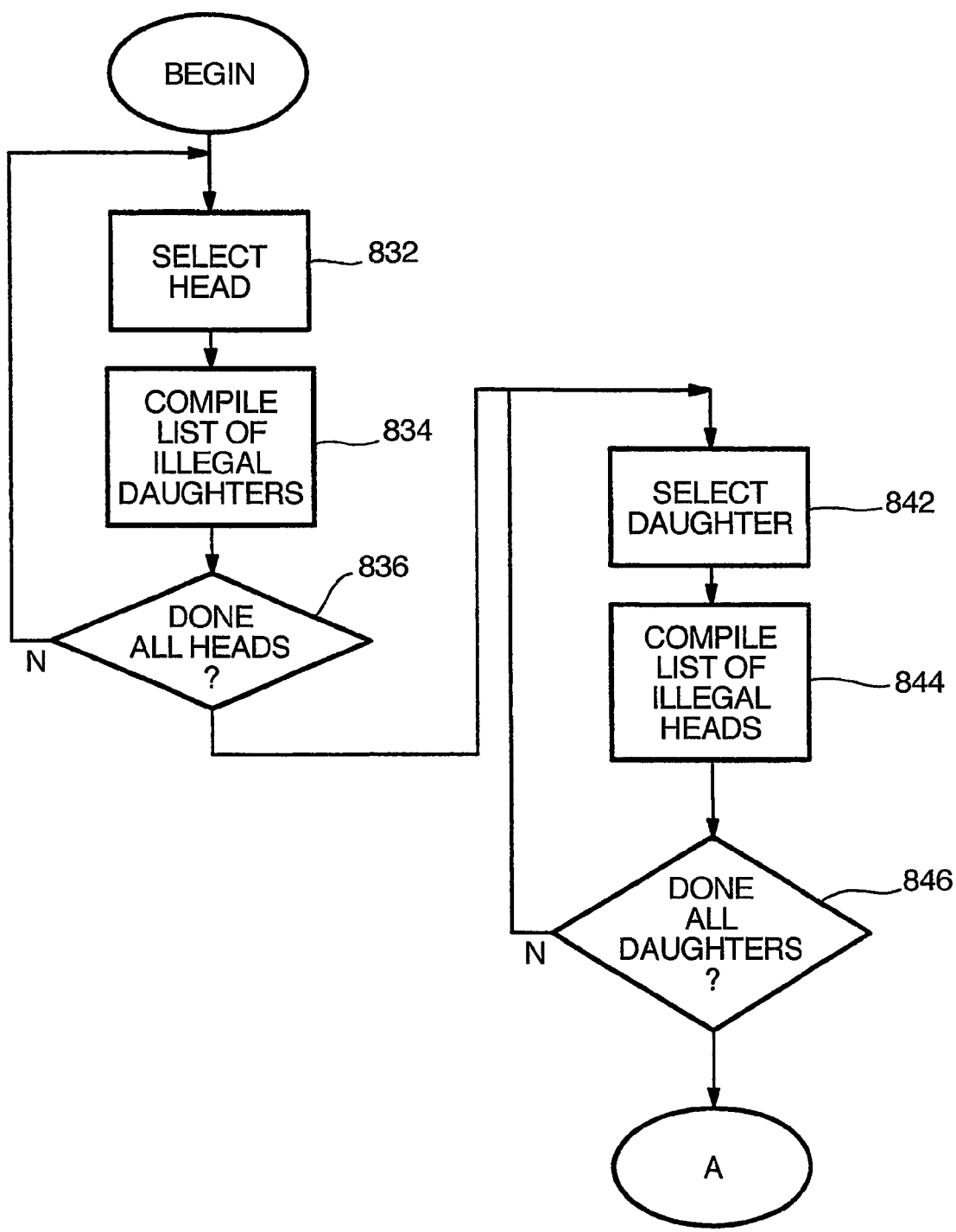
FIG. 23 (comprising FIGS. 23a and 23b) is a flow diagram showing the third stage in the process of the third embodiment.

Referring to FIG. 23*a*, in step 832, a first head within the set of illegal head/daughter pairs is located (the process is performed for each of the surface and dependency sets, but only one process will here be described for clarity). The daughters which occur with all other instances of that head in the set are collected into a set of illegal daughters for that head (step 834).

Figure 23B:
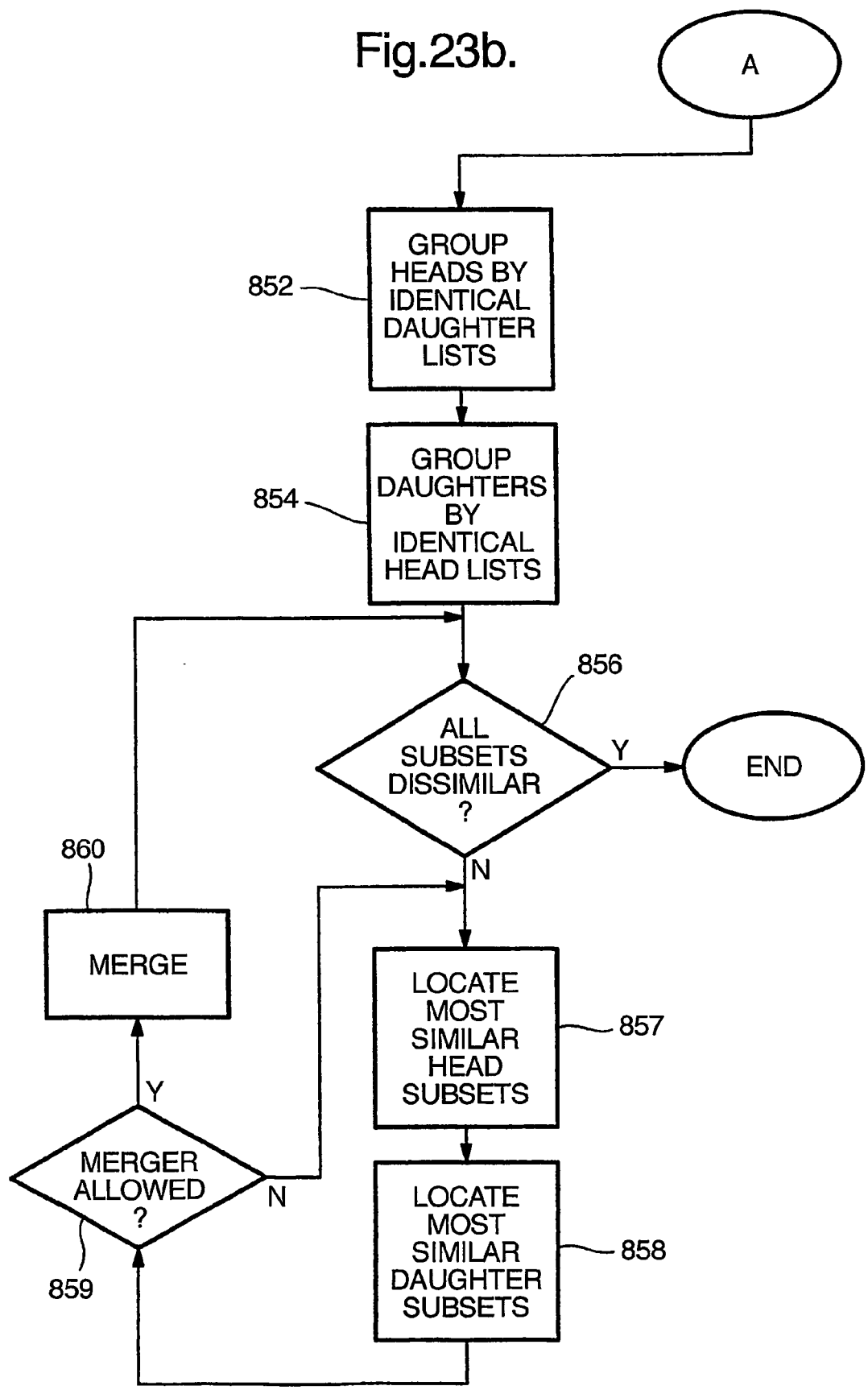

When (step 836) the operation has been repeated for each distinct head in the set, then in step 842, a first daughter is selected from the set of illegal pairs, and (similarly) the respective heads occurring with all instances of that daughter in the set of pairs are compiled into a set of illegal heads for that daughter (step 844). When all daughter and head sets have been compiled (both for the surface and for the dependency lists of pairs) (step 846) the process passes to step 852 of FIG. 23*b*.

In step 852, the set of heads (each with a set of daughters with which it cannot be combined) is partitioned into a number of subsets. All heads with identical daughter sets are grouped and stored together to form a subset. The result is a number of subsets corresponding to the number of different behaviours of heads.

In step 854, the same process is repeated for the set of daughters, so as to partition the daughters into groups having identical sets of heads.

Next, in step 856, it is determined whether all the head and daughter subsets are sufficiently dissimilar to each other yet. For example, they may be deemed dissimilar if no subset has any daughter in common with another. Where this is the case (step 856), the process finishes.

Otherwise, the two subsets of heads with the most similar daughter sets (i.e. the largest number of daughters in common—the largest intersection) are found (step 857). Similarly, in step 858, the two most similar subsets of daughters (measured by the number of heads they have in common) are found.

In step 859 it is tested whether the merger of the two head sets, and the two daughter sets, would be allowable. It is allowable unless the merger would have the effect of making illegal a combination of head and daughter that occurred in the example texts (and hence disabling a valid translation). If unallowable, the next most similar sets are located (step 857, 858).

If the merger is allowable, then (step 860) the two head sets are merged, and the daughter sets of all heads of the merged subset becomes the union of the daughter sets of the two previous subsets (that is, each head inherits all daughters from both subsets). Similarly, the two daughter sets are merged, and the head sets for each daughter become the union of the two previous head sets.

The process then returns to step 856, until the resulting subsets are orthogonal (that is, share no common members within their lists). At this point, the process finishes, and the resulting subsets are combined to generate a final set of head/daughter pairs which cannot be combined in translation.

This is then stored within the rules database 232, and applied during subsequent translations to restrict the heads selected to unite with each daughter during analysis. As mentioned above, separate sets are maintained for the surface representation and for the dependency representation.

Thus, this embodiment, like the last, simplifies and generalises the behaviours exhibited by translation components. Whereas, however, the preceding generalisation embodiment operated to expand the range of possible translation units, the present embodiment, by generalising restrictions on translation unit combinations, operates to restrict the range of legal translations which can be produced.

It will be appreciated that the method of this third embodiment distinguishes from the previously mentioned work in this field by inferring constraints to eliminate incorrect re-translations of the training example texts.

CONCLUSION

The present invention in its various embodiments provides a translation system which does not require manually written linguistic rules, but instead is capable of learning translation rules from a set of examples which are marked up using a user interface by a human. The marked up examples are then pre-processed to generalise the translation, and to restrict the number of ungrammatical translation alternatives which could otherwise be produced.

The restriction and generalisation examples both rely on the principle of using the simplest models which are consistent with the example data.

The form employed results in translation units which resemble normal grammar or logic rules to the point where a simple parser, combined with the unification features of the PROLOG language or similar languages, can perform translation directly.

Embodiments of the invention may be used separately, but are preferably used together.

Whilst apparatus which comprises both a development program 220 and a translation program 230 has been described, it will be clear that the two could be provided as separate apparatus, the development apparatus developing translation data which can subsequently be used in multiple different translation apparatus. Whilst apparatus has been described, it will be apparent that the program is readily implemented by providing a disc containing a program to perform the development process, and/or a disc containing a program to perform the translation process. The latter may be supplied separately from the translation data, and the latter may be supplied as a data structure on a record carrier such as a disc. Alternatively, programs and data may be supplied electronically, for example by downloading from a web server via the Internet.

Conveniently the present invention is provided for use together with a translation memory of translation jobs performed by a translator, so as to be capable of using the files in the memory for developing translation data.

It may be desirable to provide a linguistic pre- and post-processor program arranged to detect proper names, numbers and dates in the source text, and transfer them correctly to the target text.

Whilst the present invention has been described in application to machine translation, other uses in natural language processing are not excluded; for example in checking the grammaticality of source text, or in providing natural language input to a computer. Whilst text input and output have been described, it would be straightforward to provide the translation apparatus with speech-to-text and/or text-to-speech interfaces to allow speech input and/or output of text.

Whilst particular embodiments have been described, it will be clear that many other variations and modifications may be made. The present invention extends to any and all such variations, and modifications and substitutions which would be apparent to the skilled reader, whether or not covered by the append claims. For the avoidance of doubt, protection is sought for any and all novel subject matter and combinations thereof.

Unless the context clearly requires otherwise, throughout the description and the claims, the words "comprise", "comprising" and the like are to be construed in an inclusive sense as opposed to an exclusive or exhaustive sense; that is to say, in the sense of "including, but not limited to".

Any discussion of the prior art throughout the specification should in no way be considered as an admission that such prior art is widely known or forms part of common general knowledge in the field.

The invention claimed is:

1. A computer language translation development system, for developing data for use in translation, comprising:
    means for utilizing corresponding source and target example texts to generate translation units each comprising, in the source and/or target language, a first language item and a second language item of the same language, and
    means for subsequently generating restrictions on candidate second language items which can be combined with each said first language item.

2. A system according to claim 1, in which the restrictions comprise for each first language item a list of second language items with which that first language item should not be combined during analysis of source text and/or generation of target text.

3. A computer natural language translation system, arranged to use data developed by a system according to claim 1.

4. A computer program comprising code to execute on a computer to cause said computer to act as the system of claim 1.

5. A computer natural language translation system, arranged to use data developed by a system according to claim 1.

6. A system according to claim 1, in which said generating means is arranged to select an initial set of restrictions, and to generalize generalise said initial set of restrictions to provide a generalized generalised set of restrictions.

7. A system according to claim 6, in which said selection of an initial set of restrictions is performed by using said translation units to retranslate said source and target example texts, so as to generate multiple candidate translations thereof, and generating a list of restrictions which, if used to translate said source and target example texts, permit generation of said source and target example texts but limit the number of candidate translations which do not match said source and target example texts.

8. A system according to claim 6, in which said initial set of restrictions is selected so as to represent, of all possible sets of restrictions, a relatively small number of restrictions.

9. A system according to claim 6, in which said generating means is arranged to generalize said initial set of restrictions by locating subsets of first language items which exhibit similar restrictions, and by amending the restrictions thereof to increase the similarity of their restrictions.

10. A system according to claim 6, in which said generalization is performed by induction.

11. A system according to claim 6, in which said generalization is performed so as to reduce the number of distinct behaviours relative to the number of initial behaviours.

12. A system according to claim 8, in which said initial set of restrictions is selected so as to represent the smallest possible set of restrictions.

13. A system according to claim 9, in which the generating means is arranged to allocate each subset of first items a set of restrictions which corresponds to the union of all restrictions of all members of that subset.

14. A computer language translation development system, for developing data for use in translation, comprising:
    means for generating original translation units each comprising, in the source and/or target language, a first language item, and property data which restricts with which second language items that first language item can occur; and means for generating additional synthetic translation units comprising new combinations of the first language items and property data of said original translation units.

15. A system according to claim 14, in which said synthetic translation units are generated by:

locating translation units which have similar property data.

16. A system according to claim 14, in which the property data comprises at least one second language item of the same language as the first and with which it must occur in that translation unit.

17. A computer program comprising code to execute on a computer to cause said computer to act as the system of claim 14.

18. A system according to claim 15, in which said synthetic translation units are generated by:

locating at least first translation unit, and a second translation unit which comprise the same property data as the first with a different first language item to the first;

locating a third translation unit which comprises the same first language item as the first translation unit and different property data; and generating a synthetic fourth translation unit which comprises the same first language item as the second translation unit, and the same property data as the third translation unit.

19. A system according to claim 16, in which the first language item comprises a head of a translation unit and the property data comprises a list of daughters of that head.

20. A method for inferring generalizations of translation units from a set of translation unit examples comprising;

the identification of analogous pairs of translation units, each comprising at least one language item and the creation of new translation units which reduce the number of distinct language item behaviours.

* * * * *